(12) United States Patent
Grichnik et al.

(10) Patent No.: US 8,676,630 B2
(45) Date of Patent: Mar. 18, 2014

(54) SYSTEMS AND METHODS FOR SELECTIVELY UPDATING FORECAST DATA

(75) Inventors: Anthony James Grichnik, Eureka, IL (US); Stephen James Forret, Morton, IL (US); Scott Edward Taylor, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 103 days.

(21) Appl. No.: 13/367,721

(22) Filed: Feb. 7, 2012

(65) Prior Publication Data

US 2013/0204661 A1    Aug. 8, 2013

(51) Int. Cl.
*G06F 17/00* (2006.01)

(52) U.S. Cl.
USPC ......................................................... 705/7.31

(58) Field of Classification Search
USPC ......................................................... 705/7.31
See application file for complete search history.

(56) References Cited

U.S. PATENT DOCUMENTS

| | | | |
|---|---|---|---|
| 6,205,431 B1 | 3/2001 | Willemain et al. |
| 7,080,026 B2 | 7/2006 | Singh et al. |
| 7,213,007 B2 | 5/2007 | Grichnik |
| 7,467,095 B2 | 12/2008 | Ouimet |
| 7,499,777 B2 | 3/2009 | Grichnik et al. |
| 7,593,834 B2 | 9/2009 | Levitan et al. |
| 7,593,839 B1 | 9/2009 | Wu et al. |
| 8,014,983 B2 | 9/2011 | Crowe et al. |
| 2005/0159973 A1* | 7/2005 | Krause et al. ................. 705/1 |
| 2005/0165635 A1 | 7/2005 | Moessner |
| 2006/0241986 A1 | 10/2006 | Harper |
| 2007/0022061 A1 | 1/2007 | Brinn et al. |
| 2008/0027841 A1 | 1/2008 | Eder |
| 2008/0103874 A1 | 5/2008 | Zimmermann |
| 2009/0132216 A1 | 5/2009 | Grichnik et al. |
| 2009/0281869 A1 | 11/2009 | Bai et al. |
| 2010/0223215 A1 | 9/2010 | Karypis et al. |
| 2011/0040596 A1 | 2/2011 | Chen et al. |
| 2011/0071857 A1 | 3/2011 | Malov et al. |
| 2011/0130857 A1 | 6/2011 | Budiman et al. |

FOREIGN PATENT DOCUMENTS

JP    2009/208933    9/2009

OTHER PUBLICATIONS

Grichnik, Anthony, "Process Modeling: Challenges and Applications", Dec. 2004 (6 pages).

* cited by examiner

*Primary Examiner* — Thomas Dixon
(74) *Attorney, Agent, or Firm* — Finnegan, Henderson, Farabow, Garrett & Dunner LLP

(57) ABSTRACT

A characteristic forecasting system is disclosed. The characteristic forecasting system may have a memory module and a processor. The memory module may store instructions, that, when executed, enable the processor to generate forecast data for a target item based on historical data related to the target item, the forecast data representing a forecast for characteristics of the target item. The processor may also be enabled to analyze a subset of the historical data within an observation window to determine whether the forecast data should be updated with new forecast data and generate the new forecast data for the target item responsive to a determination that the forecast data should be updated with the new forecast data.

8 Claims, 12 Drawing Sheets

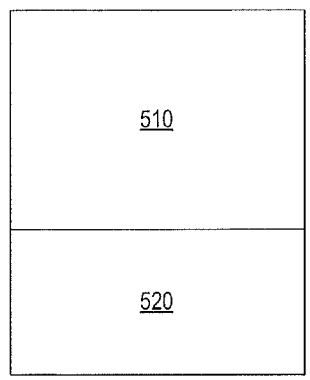
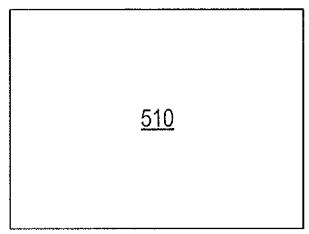
FIG. 5A    FIG. 5B
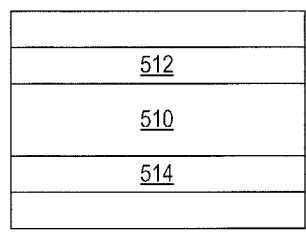
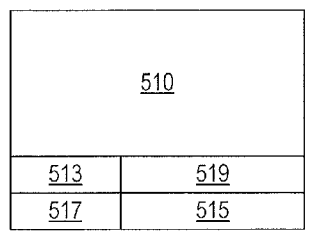
FIG. 5C
FIG. 5D

SYSTEMS AND METHODS FOR SELECTIVELY UPDATING FORECAST DATA

TECHNICAL FIELD

This disclosure relates generally to forecasting methods and, more particularly, to forecasting characteristics of a target item using a genetic algorithm.

BACKGROUND

Organizations, such as those that produce, buy, sell, and/or lease products, may desire to forecast information concerning a product. For example, an organization that manufactures one or more products may desire to accurately forecast the demand for the product, the organization's production schedule for the product, and/or a supplier's delivery schedule for subcomponents of the product. Moreover, organizations may desire to have up-to-date and accurate forecast information. Thus, some organizations may desire to update forecast information on a periodic basis, such as daily, weekly, monthly, etc. However, constantly updating forecast information when it is not necessarily required may needlessly occupy computing resources and may cause problems with the suppliers, customers, and/or investors of an organization that continuously changes its forecast.

U.S. Pat. No. 7,213,007 (the '007 patent) to Grichnik is directed to forecasting characteristics of a product using a genetic algorithm. In particular, the '007 patent discloses implementing a genetic algorithm to produce equations that model forecast information for a product. The genetic algorithm may determine data values for the equations so as to minimize a statistical error between historical data and data calculated by the equations. While the '007 patent may help to generate statistically accurate forecasts, the system of the '007 patent does not determine how often and when the forecasts may be updated.

The disclosed methods and systems are directed to solving one or more of the problems set forth above and/or other problems of the prior art.

SUMMARY

In one aspect, the present disclosure is directed to a computer-implemented method for forecasting characteristics of a target item. The method may include generating forecast data for a target item based on historical data related to the target item, the forecast data representing a forecast for characteristics of the target item. The method may also include analyzing a subset of the historical data within an observation window to determine whether the forecast data should be updated with new forecast data and generating, by the one or more processors, the new forecast data for the target item responsive to a determination that the forecast data should be updated with the new forecast data.

In another aspect, the present disclosure is directed to a characteristic forecasting system. The characteristic forecasting system may include a memory module and a processor. The memory module may store instructions, that, when executed, enable the processor to generate forecast data for a target item based on historical data related to the target item, the forecast data representing a forecast for characteristics of the target item. The processor may also be enabled to analyze a subset of the historical data within an observation window to determine whether the forecast data should be updated with new forecast data and generate the new forecast data for the target item responsive to a determination that the forecast data should be updated with the new forecast data.

In yet another aspect, the present disclosure is directed to a computer-readable medium. The computer readable medium may store instructions that, when executed, cause one or more processors to generate forecast data for a target item based on historical data related to the target item, the forecast data representing a forecast for characteristics of the target item. The instructions may also cause the processors to analyze a subset of the historical data within an observation window to determine whether the forecast data should be updated with new forecast data and generate the new forecast data for the target item responsive to a determination that the forecast data should be updated with the new forecast data.

BRIEF DESCRIPTION OF THE DRAWINGS

FIGS. 5A-5D illustrate block diagrams reflecting an exemplary reproduction process consistent with disclosed embodiments;

DETAILED DESCRIPTION

Figure 1:
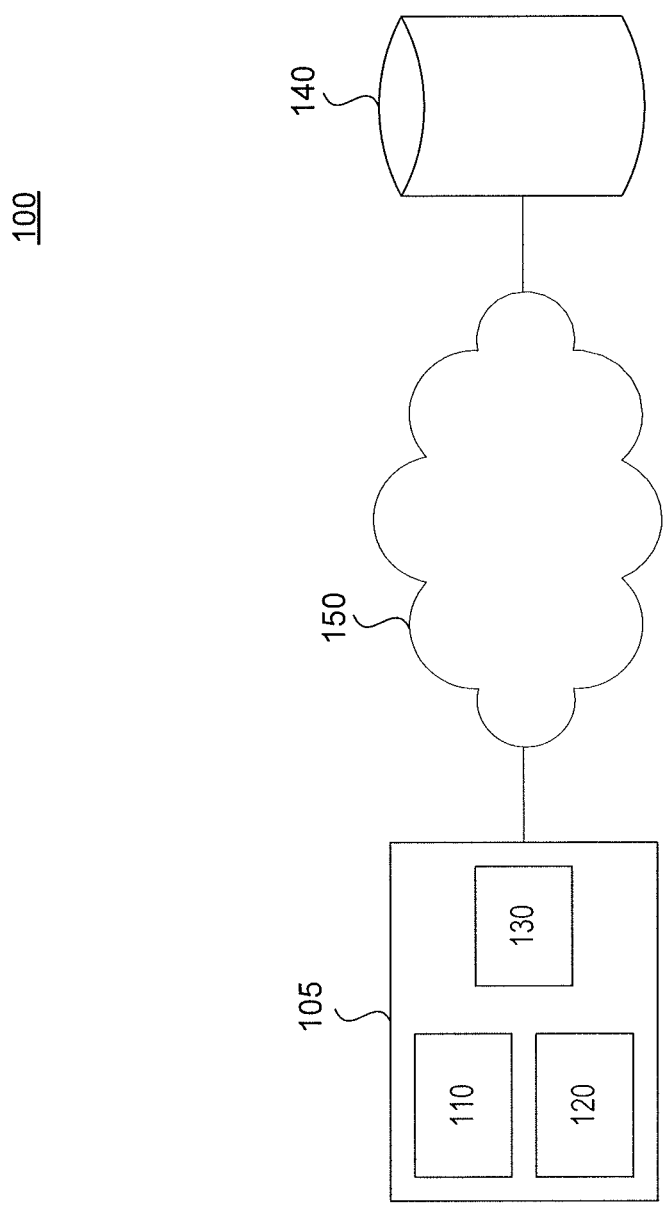
FIG. 1 is a diagrammatic illustration of an exemplary forecasting system that may be configured to perform certain functions consistent with disclosed embodiments.

FIG. 1 illustrates an exemplary characteristic forecasting system 100 in which features and principles consistent with disclosed embodiments may be implemented. As shown in FIG. 1, characteristic forecasting system 100 may include a plurality of modules that perform various functions consistent with certain features related to disclosed embodiments. In one embodiment, characteristic forecasting system 100 may include a forecasting module 105 and a database 140 connected via a network 150.

Forecasting module 105 may be a computing system that performs various functions consistent with certain embodiments. In one embodiment, forecasting module may be configured to forecast the demand for selected products based on historical production activities or other historical data, such as product history data. Forecasting module 105 may include a processor 110, a memory module 120, and an interface module 130. Processor 110 may include one or more processor devices known in the art, such as a microprocessor, microcontroller, laptop computer, desktop computer, workstation, mainframe, etc. Memory module 120 may include one or more storage devices configured to store information that is used by processor 110 and/or other entities internal and external to forecasting module 105. For example, memory module 120 may store one or more characteristic forecast programs that, when executed, enable processor 110 to forecast characteristics (e.g., demand) of a target item (e.g., a product), consistent with disclosed embodiments. Interface module 130 may be one or more devices that facilitate the transfer of information between forecasting module 105 and external components, such as database 140 and/or one or more user devices (not shown).

A product, as used herein, may represent any type of physical good that is designed, developed, manufactured, and/or delivered by a source, such as, for example, a manufacturer or a distributor. The product may also represent replacement parts and/or service parts for existing products, components, or sub-components. Moreover, those skilled in the art will appreciate that a product may represent other types of goods, such as a non-physical object (e.g., stocks, bonds, financial commodities, etc.) that may be generated, obtained, delivered, bought, and/or sold. A target item, as used herein, may represent a tangible object, such as a product. Alternatively, a target item may represent a non-physical product (e.g., stocks, bonds, financial commodities, etc.) or other non-tangible items, such and mathematical representations (e.g., vibration analysis data). Although the forecast processes discussed below will be described with respect to a product manufactured by a business entity, those skilled in the art will appreciate that the following description may apply to any type of target item.

Database 140 may represent one or more storage devices that store information used by forecasting module 105 to perform certain functions consistent with disclosed embodiments. In one embodiment, database 140 stores product history data. Product history data stored in database 140 may include previous production data for a product, such as a number of products demanded, ordered, sold, manufactured, and/or shipped over a period of time (T) in selected intervals (e.g., days, weeks, months, quarters, years, etc.). Further, the product history data may represent the number of units of the product available during a certain stage of manufacture, such as molding stage, engine placement stage, etc. Product history data stored in database 140 may also include historical data regarding components of products, such as data indicating a number of components for a product that have been received from a supplier at selected time intervals. The selected intervals of time t may represent, for example, equal periods of time over which the products are monitored.

Database 140 may also store financial data related to products. For example, database 140 may store information such as the sales price per unit, production cost per unit, profit margin per unit, unit carrying cost, etc., related to one or more products. Database 140 may also store information related to inventory levels of one or more products, such as a current inventory level, maximum inventory level, minimum inventory level, etc., of one or more products. Moreover, database 140 may store information such as a maximum number of products that may be produced in a given time interval (e.g., # of units/time interval), a maximum velocity with which production may be ramped up (e.g., # of units/time interval$^2$), or a maximum acceleration with which production may be ramped up (e.g., # of units/time interval$^3$). Further, database 140 may store any other information that may be used by forecasting module 105 in accordance with one or more of the embodiments discussed below.

Network 150 shown in FIG. 1 may include any one of or combination of wired or wireless networks. For example, network 150 may include wired networks such as twisted pair wire, coaxial cable, optical fiber, and/or a digital network. Likewise, network 150 may include any wireless networks such as RFID, microwave or cellular networks or wireless networks employing, e.g., IEEE 802.11 or Bluetooth protocols. Additionally, network 150 may be integrated into any local area network, wide area network, campus area network, or the Internet.

Although FIG. 1 shows the configuration of modules 110-140 as separate elements, those skilled in the art will appreciate that characteristic forecasting system 100 may be implemented in a number of different configurations consistent with disclosed embodiments. For example, modules 110, 120, 130, and 140 may be combined into a single module that includes software, hardware, and/or a combination of both. Alternatively, characteristic forecasting system 100 may be configured as a distributed system, with modules 110, 120, 130, and 140 distributed in remote locations and interconnected by communication paths, such as Local Area Networks (LANs), Wide Area Networks (WANs), and any other type of network that may facilitate communications and the exchange of information between the modules and/or any other elements that may be implemented by characteristic forecasting system 100. Also, characteristic forecasting system 100 may include additional or fewer modules than those depicted in FIG. 1.

In certain embodiments, forecasting module 105 may be an end-user device. In other embodiments, forecasting module 105 and database 140 may be connected to one or more end-user devices (not shown) via network 150. In these embodiments, an end-user at an end-user device may send data, such as product history data, financial data, inventory data, etc., to forecasting module 105 and/or database 140 via network 150. For example, the end-user device may include a web browser and/or other application that enables it to send information to forecasting module 105 and/or database 140 and request forecast data from forecasting module 105. Forecasting module 105 may then determine forecast data based on the data provided by the end-user device, e.g., according to one or more embodiments discussed below, and may then send the forecast data to the end-user device, e.g., via the browser or other application. According to these embodiments, the processing performed by forecasting module 105, according to one or more embodiments discussed below, may be performed "in the cloud" with respect to the end-user, and then the results of the processing (e.g., the forecast data representing a forecast of a characteristic of a target item) sent back to the end-user. The owner or administrator of forecasting module 105 may charge a fee of some sort to the one or more end-users for using the forecasting services provided by forecasting module 105.

Figure 2:
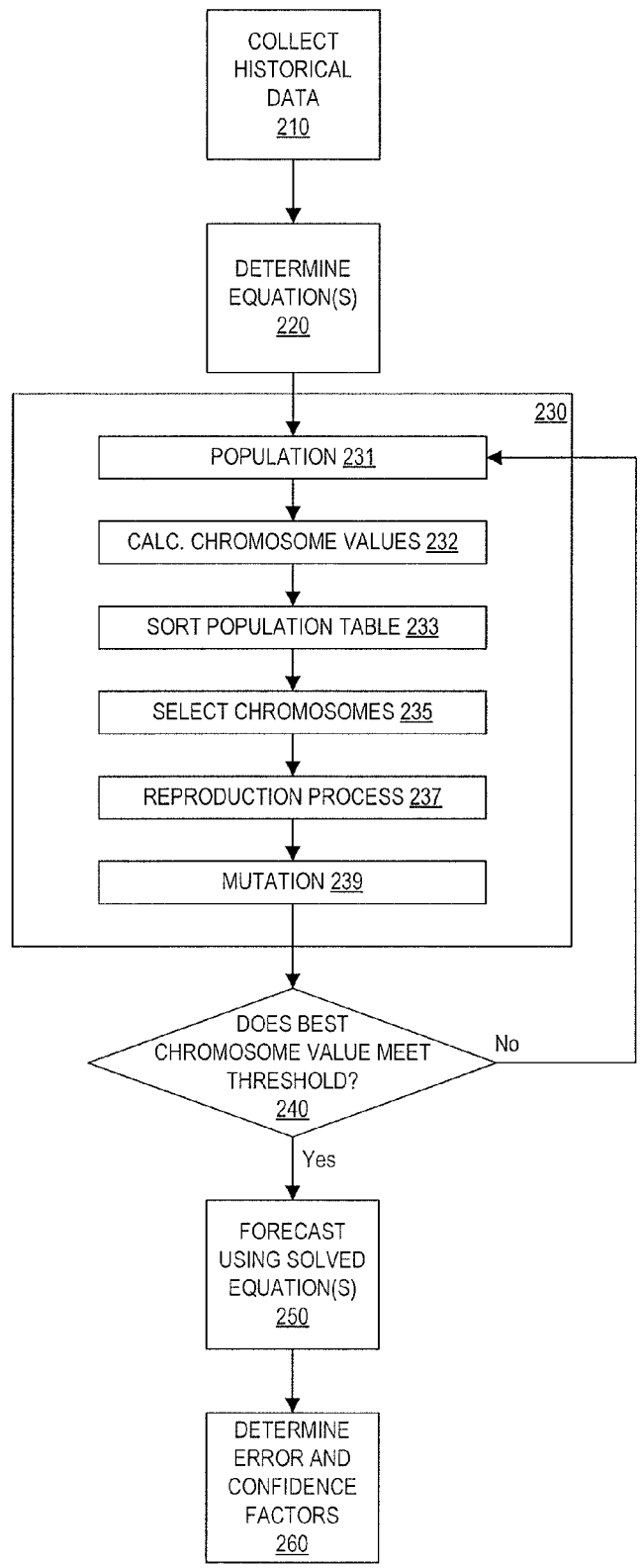
FIG. 2 is a flowchart illustrating an exemplary forecasting process consistent with disclosed embodiments.

In certain embodiments, exemplary characteristic forecasting system 100 may be configured to determine a forecast function that produces forecast data with a knowable level of accuracy at a given time in the future. FIG. 2 shows a flowchart of an exemplary forecast process that may be performed by characteristic forecasting system 100. As shown, forecasting module 105 may begin with obtaining historical data associated with the characteristics of a target item that is to be forecasted (step 210).

Figure 3:
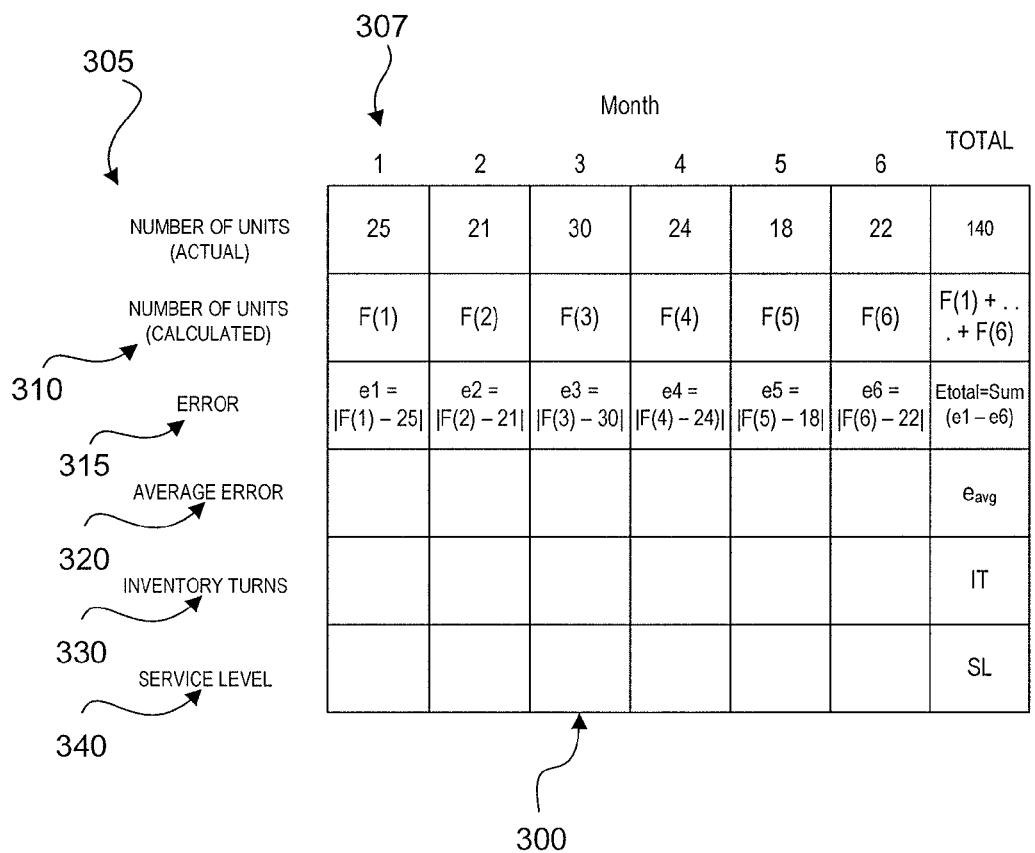
FIG. 3 illustrates an exemplary table including historical data consistent with disclosed embodiments.

Characteristics, as used herein, may represent any type of attribute associated with a target item. For example, characteristics may include manufacturing, developing, design, ordering, sale, purchase, and shipping numbers associated with the target item. In one embodiment, forecasting module 105 may collect data, such as the data discussed above, associated with a product from database 140. As discussed, the data may be arranged to represent values, such as a number of units of a product demanded, ordered, sold, manufactured, and/or shipped over a predetermined period of time (T) in selected intervals (e.g., days, weeks, months, quarters, years, etc.). In this example, the historical data collected by forecasting module 105 may represent the number of units of a product manufactured for each month over a period of six months. Therefore, time period T is equal to six (6). FIG. 3 shows a non-limiting example of a table 300 including the number of products manufactured over a period (T) of six months. As shown, table 300 may include an exemplary number of actual units manufactured (305) for each of a plurality of months (307) that make up the time period T. Of course, table 300 may alternatively or additionally include an exemplary number of actual units demanded, ordered, shipped, sold, etc., consistent with disclosed embodiments.

Forecasting module 105 may also determine a forecast function including one or more mathematical equations to represent a forecast of a manufacture of the products based on the historical data (step 220). For example, forecasting module 105 may select from a plurality of types of mathematical equations (e.g., polynomial, linear, sinusoidal, etc.). In this exemplary scenario, forecasting module 105 may determine that the forecast function uses linear and sinusoidal equations to represent the manufacture of the products by the business entity that provided the historical data. The basic equation for a sinusoidal function is: $f(t)=A*Sin(B*t+C)+F$, where A, B, C, and F are the gain, rate, phase, and offset, respectively, in the sinusoidal function. The basic equation for a linear function is: $f(t)=m*t+D$, where m and D are the slope and y intercept, respectively, of the linear function.

Forecasting module 105 may also perform a data enhancement process to determine data values for each of the variables in the determined equations (step 230). In one embodiment, the forecasting process may implement a genetic algorithm to determine data values for the variables included in each of the one or more equations of the forecast function that produce results corresponding to a target value or values. For instance, the data values determined by the genetic algorithm implemented by exemplary embodiments may represent the "best" data values for a variable in equations that would produce a result most reflective of a target value. Those skilled in the art will appreciate that other types of data enhancement algorithms and/or methodologies may be implemented to determine the best values for each equation. In this embodiment, the genetic algorithm may begin by creating a population table of information including data values for each variable in each equation of the forecast function determined in step 220 (step 231). The population table may include an arrangement of cells and may have a selected size based on the determined one or more equations.

In this exemplary embodiment, five sinusoidal equations and five linear equations may be selected to represent the historical data. Thus, the combined equation used to represent the historical data, and thus used to provide forecasting information, may be expressed generally as: $F(t)=A_1 Sin(B_1 t+C_1)+F_1+A_2 Sin(B_2 t+C_2)+F_2+\ldots+A_5 Sin(B_5 t+C_5)+F_5+m_1 t+D_1+\ldots+m_5 t+D_5$. Then, data values for each variable $A_1$-$A_5$, $B_1$-$B_5$, $C_1$-$C_5$, $F_1$-$F_5$, $m_1$-$m_5$, and $D_1$-$D_5$ may be used to populate the table. However, those skilled in the art will appreciate that any number of each type of equation may be selected to create the population table.

Figure 4:
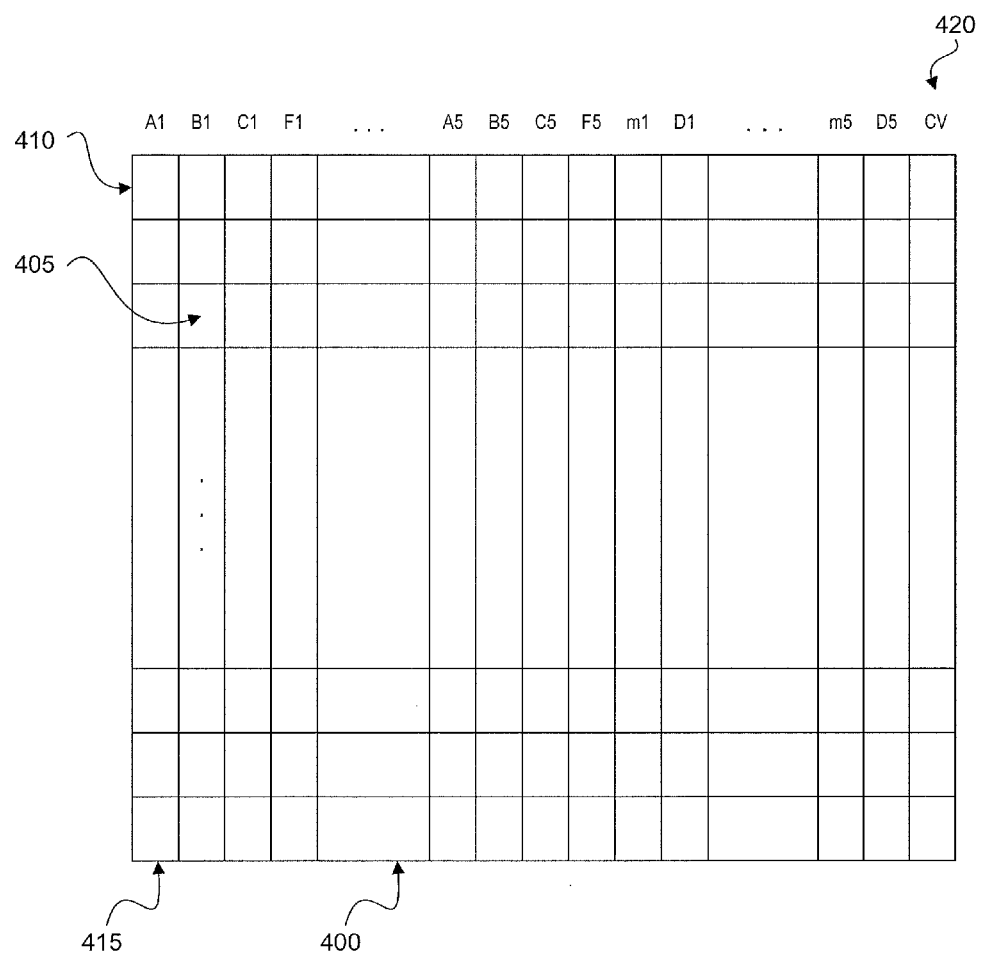
FIG. 4 illustrates an exemplary population table consistent with disclosed embodiments.

FIG. 4 shows an exemplary population table 400 consistent with disclosed embodiments. As shown, population table 400 includes a plurality of cells 405 configured in an array of rows 410 and columns 415. Each cell 405 may be referred to as a gene and each row 410 may be referred to as a chromosome. The total number of chromosomes in a population table may be a function of the number of columns. For instance, the number of chromosomes in population table 400 may be determined based on the product of the number of columns and a variable W, where W is an integer greater than 1. Therefore, because in this example there are a total of 20 sinusoidal columns (e.g., 5 sinusoidal equations*4 variables (A, B, C, F)) and 10 linear columns (e.g., 5 linear equations*2 variables (m, D)), the total number of chromosomes in population table 400 may be 600 (e.g., 30 columns*W=600, where W=20). In one embodiment, a user may select the value for W prior to, or during, the data enhancement process. Alternatively, forecasting module 105 may automatically select the value for W.

The configuration of population table 400 may vary based on the different variables used in the various numbers and types of equations included in the forecast function F(t). For example, as discussed in greater detail below, certain embodiments may include one or more functions that attenuate or otherwise modify the signal created by the one or more sinusoidal and/or linear equations during particular time periods. These attenuating functions may also include one or more variables which likewise may be determined based on a genetic algorithm. Thus, each chromosome 410 in population table 400 may also include one or more variables corresponding to one or more attenuating functions, discussed in greater detail below.

After determining the configuration of population table 400, forecasting module 105 may populate the table with randomly chosen values. In certain embodiments, forecasting module 105 may choose values for the variables that are within corresponding boundary values. For example, forecasting module 105 may populate cell 405 in population table 400 with a randomly chosen data value that is between the boundary values for the phase variable B for a sinusoidal equation. These boundary values may be selected by a user, or selected by forecasting module 105, e.g., based on the historical data.

After each cell in table 400 is populated with a corresponding data value, forecasting module 105 may determine a chromosome value (chromosome value column 420) for each chromosome (row 410) in population table 400 (step 232). A chromosome value may be calculated using a goal function. A goal function may include a mathematical function or expression used to assess one or more chromosomes by generating a chromosome value for each of the chromosomes.

In certain embodiments, a goal function may determine how close calculated values calculated with a particular chromosome are to actual values in the historical data collected in Step 210. In one embodiment, the goal function (GF) may have a formula:

$$GF=e_{avg}*(e_{max})^n$$

where $e_{avg}$ is the average error between calculated values and actual values for a corresponding chromosome across multiple time intervals in the historical data, $e_{max}$ is the maximum single point error between the calculated and actual values across multiple time intervals in the historical data, and n is an integer greater than zero (e.g., 1, 2, 3, etc.). The value of n may be determined by a user operating forecasting module 105 or may be determined by forecasting module 105 autonomously. Further, the value of n may be changed prior, during, or subsequent to the performance of the forecasting process by forecasting module 105.

To calculate the average error, forecasting module 105 may sum the error for each interval within time period T and divide by the time period T. To calculate the maximum single point error, forecasting module 105 may determine the maximum error amongst the errors determined for each interval within time period T. To determine the error for each interval, forecasting module 105 may calculate the F(t) data value corresponding to each historical data value collected in Step 210 (e.g., each month of table 300). To determine the F(t) value for each interval, forecasting module 105 may sum the solution (e.g., F value) for each equation selected in Step 220 based on the various variables stored in the population table. For example, based on the data values for each cell in table 400, the calculated data values for each month corresponding to table 300 are:

time period t=1

$$F(1)=A_1 \sin(B_1+C_1)+F_1+A_2 \sin(B_2+C_2)+F_2+\ldots A_5 \sin(B_5+C_5)+F_5+m_1+D_1+\ldots +M_5+D_5$$

time period t=2

$$F(2)=A_1 \sin(B_1(2)+C_1)+F_1+A_2 \sin(B_2(2)+C_2)+F_2+\ldots .A_5 \sin(B_5(2)+C_5)+F_5+m_1(2)+D_1+\ldots +m_5(2)+D_5$$

time period t=3

$$F(3)=A_1 \sin(B_1(3)+C_1)+F_1+A_2 \sin(B_2(3)+C_2)+F_2+\ldots .A_5 \sin(B_5(3)+C_5)+F_5+m_1(3)+D_1+\ldots +m_5(3)+D_5$$

time period $t=4$ $$F(4)=A_1 \sin(B_1(4)+C_1)+F_1+A_2 \sin(B_2(4)+C_2)+F_2+\ldots .A_5 \sin(B_5(4)+C_5)+F_5+m_1(4)+D_1+\ldots +m_5(4)+D_5$$

time period t=5

$$F(5)=A_1 \sin(B_1(5)+C_1)+F_1+A_2 \sin(B_2(5)+C_2)+F_2+\ldots .A_5 \sin(B_5(5)+C_5)+F_5+m_1(5)+D_1+\ldots +m_5(5)+D_5$$

time period t=6

$$F(6)=\sin(B_1(6)+C_1)+F_1+A_2 \sin(B_2(6)+C_2)+F_2+\ldots A_5 \sin(B_5(6)+C_5)+F_5+m_1(6)+D_1+\ldots +m_5(6)+D_5$$

As shown in FIG. 3, the calculated data values for F(1)-F(6) (calculated number of units manufactured 310) may be used by forecasting module 105 to determine the error 315 for each month. Forecasting module 105 may determine the error by calculating the difference between the calculated data values (calculated number of units manufactured 310) and the actual data values (actual number of units manufactured 305) for each interval in time period T. Once the error for each interval is determined, forecasting module 105 may then determine the average error $e_{avg}$ by summing the error data values for each interval (e.g., months 1-6 in table 300) and dividing by the time period T (e.g., T=6 in table 300).

In certain embodiments, the average error $e_{avg}$ and the maximum error $e_{max}$ may be used in accordance with the goal function discussed above to determine the chromosome value for the corresponding chromosome whose variables were used to calculate the average error. For example, the chromosome value for the first chromosome 410 in table 400 may be equal to:

$$CV(\text{chromosome } 1)=e_{avg}*(e_{max})^n.$$

The chromosome value may be calculated using the average error $e_{avg}$ that was determined using the cells in chromosome 1 (410), the largest error data value ($e_{max}$) corresponding to the calculated error from the historical data (e.g., error row 315 in table 300), and a predetermined value for n (e.g., n=2).

Further, forecasting module 105 may determine the average error $e_{avg}$ for each chromosome in population table 400 and use the calculated average error, the maximum error, and the data value n to determine a chromosome value for each corresponding chromosome in the population table. In one embodiment, forecasting module 105 may store the chromosome value for each chromosome in population table 400, shown as chromosome value column 420 in FIG. 4.

In other embodiments, forecasting module 105 may determine and use a goal function for the genetic algorithm that takes into account a measurement of one or more business goals. For example, the goal function may take into account a measurement of one or more of profit, return on net assets (RONA), inventory turns, service level, or any other combination of business goals that may be calculated based on the historical data and/or forecast data. Forecasting module 105 may calculate a chromosome value for each chromosome in a population table, such as population table 400, by using the goal function that takes into account one or more business goals. Forecasting module 105 may also store the chromosome value for each chromosome in population table 400, and may implement a genetic algorithm to determine a chromosome that maximizes the chromosome value corresponding to the goal function that takes into account one or more business goals.

If a measure of profit is incorporated into the goal function, then forecasting module 105 may calculate a profit value associated with each chromosome. For example, in certain embodiments, forecasting module 105 may calculate an amount of profit that may have been made using the data values for the forecast function variables from each chromosome generated in the genetic algorithm. That is, for each chromosome, forecasting module 105 may calculate profit as P=(profit margin per unit sold)*(# of units sold). Moreover, in certain embodiments, forecasting module 105 may calculate a measure of profit associated with each chromosome to be P=profit margin per unit sold. This measure of profit may be represented, e.g., as a percentage value or a decimal value. Forecasting module 105 and/or database 140 may store information used to calculate profit values associated with the chromosomes.

Forecasting module 105 may determine the "# of units sold" value for the exemplary profit calculation discussed above by comparing the calculated data values from the forecast function and the actual data values from the historical data. Referring back to the example shown in FIG. 3, forecasting module 105 may determine whether the total calculated number of units manufactured 310 represented as F(1)+ ... +F(6) in the example shown in FIG. 3, is greater than the total actual number of units manufactured 305, shown as 140 in the example of FIG. 3. If the total calculated number of units manufactured 310 is less than or equal to the total actual number of units manufactured 305, then forecasting module 105 may use the total calculated number of units manufactured 310 as the "# of units sold" value. On the other hand, if the total calculated number of units manufactured 310 is greater than the total actual number of units manufactured 305, then forecasting module 105 may use the total actual number of units manufactured 305 as the "# of units sold" value. This is because if the total calculated number of units manufactured is greater than the total actual number of units manufactured (or demanded, ordered, sold, etc.), then the excess units that were calculated would not have been sold.

If a measure of RONA is incorporated into the goal function, then forecasting module 105 may likewise calculate a RONA value associated with each chromosome. That is, for each chromosome, forecasting module 105 may calculate RONA as RONA=(profit)/(average inventory level*unit carrying cost). Profit may be calculated as discussed above. The unit carrying cost may be defined as UCC=(discount rate)* (unit cost). The discount rate may be the rate that a business charges itself for tying up cash. The product cost may be the cost to manufacture a single unit. The discount rate, unit cost, and/or unit carrying cost values may be stored by forecasting module 105 and/or database 140.

Forecasting module 105 may determine the "average inventory" value ($I_{avg}$) for the RONA calculation based on a comparison of the calculated number of units manufactured 310 to the actual number of units manufactured 305. For example, for each time interval t (e.g., for each month in the example of FIG. 3), forecasting module 105 may determine the inventory position for each chromosome to be:

$$I_t = \sum_{i=1}^{t} (\text{calculated \# of units } \textit{manufactured}_i) - \sum_{i=1}^{t} (\text{actual \# units } \textit{manufactured}_i) | I_t \geq 0$$

Thus, for month 1 shown in FIG. 3, the inventory $I_1$=F(1)−25, where $I_1 \geq 0$. Thus, if F(1)−25 is a negative number, $I_1$ will be set to 0. Similarly, for month 2 shown in FIG. 3, the inventory $I_2$=(F(1)+F(2))−(25+21), where $I_2 \geq 0$, such that if (F(1)+F(2))−(25+21) is a negative number, $I_2$ will be set to 0. This way, forecasting module 105 may calculate an inventory position for each interval (e.g., each month in FIG. 3). To calculate the average inventory ($I_{avg}$) used in the RONA calculation, forecasting module 105 may sum the inventory for each interval within time period T and divide by number of intervals in the time period T.

In addition to being used in the RONA calculation, average inventory $I_{avg}$ may also be used to generate an inventory turns (IT) value, which may also be incorporated into the goal function. For example, inventory turns may be calculated for a particular chromosome as IT=(total calculated # of units sold)/($I_{avg}$). Alternatively or in addition, inventory turns may be calculated for a particular chromosome as IT=(percentage of inventory turnover)/(year). Thus, inventory turns may also be represented as a percentage value or decimal value in certain embodiments.

If a measure of service level (SL) is incorporated into the goal function, then forecasting module 105 may likewise calculate an SL value associated with each chromosome. That is, for each chromosome, forecasting module 105 may calculate service level as SL=(% of orders filled). The service level may be calculated in several different ways. In one embodiment, service level may be calculated by dividing a total calculated number of units manufactured 310 by the total actual number of units manufactured 305. Thus, SL in FIG. 3 may be calculated as (F(1)+ . . . +F(6))/140. Any percentage greater than 100% may be set to 100%.

In another embodiment the service level may be individually calculated for each interval (e.g., each month in FIG. 3), and then an average service level may be calculated based on the separate interval calculations. For example, for each interval in the historical data (e.g., for each month in the example of FIG. 3), forecasting module 105 may determine the service level for each chromosome. The service level for a given time interval t may be defined as:

$$SL_t = \frac{\sum_{i=1}^{t} (\text{calculated \# of units } \textit{manufactured}_i)}{\sum_{i=1}^{t} (\text{actual \# of units } \textit{manufactured}_i)} | SL_t \leq 100\% \text{ or } 1.00$$

Thus, for month 1 shown in FIG. 3, the service level $SL_1$=F(1)/25, where $SL_t \leq 100\%$. Thus, if F(1) is greater than 25, $SL_1$ will be set to 100%. Similarly, for month 2 shown in FIG. 3, service level $SL_2$=(y1+y2)/(25+21) where $SL_2 \leq 100\%$. This way, forecasting module 105 may calculate a service level for each interval (e.g., each month in FIG. 3). To calculate the average service level (SL) for a particular chromosome over a time period, forecasting module 105 may sum the service level for each interval within time period T and divide by number of intervals in the time period T. In other embodiments, the average service level may be calculated by weighting the service level for each interval according to the number of actual units manufactured in that interval.

In certain embodiments, the goal function for the genetic algorithm may be expressed as a Euclidean distance measurement or weighted Euclidean distance measurement of two or more of the business goals, which may be calculated as discussed above. For example, if profit, RONA, inventory turns, and service level are used as four exemplary business goals then the goal function may be represented as:

$$GF = \sqrt{a(P)^2 + b(RONA)^2 + c(IT)^2 + d(SL)^2}$$

where a, b, c, and d represent the relative weighting values for profit (P), RONA, inventory turns (IT), and service level (SL). In embodiments employing a Euclidean distance measurement or weighted Euclidean distance measurement, P, RONA, IT, and SL may be calculated such that each business value measurement is expressed in the same base value. For example, each business value measurement may be expressed as percentage value, a decimal value less than or equal to one, a value between 0 and 100, etc. Calculating each of the business values according to the same base value may lead to more desirable outcomes from the genetic algorithm when employing the Euclidean distance measurement. Weighting values a, b, c, and d may be chosen to be any value between 0 and 1 such that a+b+c+d=1. Further, weighting values a, b, c, and d may be chosen by a user or administrator of characteristic forecasting system 100 based on, e.g., relative importance of different business goals to the business. For example, if a user determines that service level and RONA are the most important two features, then b and d may each be set to 0.4, and a and c may each be set to 0.1. Moreover, if a user desires to create a goal function based on only two business goals, the remaining weighting values corresponding to the other business goals may be set to zero. Those skilled in the art will appreciate that the relative weighting values may be determined according to any method consistent with disclosed embodiments.

In other embodiments, the goal function for the genetic algorithm may include weighted distributions of one or more of the business goals. For example, forecasting module 105 may identify desired distributions of business goals simultaneously to maximize the probability of obtaining desired outcomes. In certain embodiments, forecasting module 105 may simultaneously determine desired distributions of the business goals based on the zeta statistic. The zeta statistic may indicate a relationship between business goals, their value ranges, and desired outcomes. The zeta statistic may be represented as $$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Forecasting module 105 may identify a desired distribution of the business goals such that the zeta statistic of the goal function is maximized or optimized. Forecasting module 105 may use another genetic algorithm to search the desired distribution of business goals with the purpose of maximizing the zeta statistic for the goal function. Forecasting module 105 may select a candidate set of business goals with predetermined search ranges and run a simulation of the forecasting process to calculate the zeta statistic parameters based on the business goals. Forecasting module 105 may obtain $\bar{x}_i$ and $\sigma_i$ by analyzing the candidate set of business goals, and obtain $\bar{x}_j$ and $\sigma_j$ by analyzing the outcomes of the simulation. Further, forecasting module 105 may obtain $|S_{ij}|$ from a trained neural network as an indication of the impact of ith input on the jth outcome.

Referring back to FIG. 2, once the chromosome values for each chromosome are determined, forecasting module 105 may sort the population table based on the determined chromosome values (step 233). Forecasting module 105 may sort the population table in ascending or descending order based on the goal function being used and whether the genetic algorithm is attempting to minimize or maximize the goal function. For example, if the forecasting process is attempting to minimize the goal function (and thus the chromosome value) to a predetermined threshold value, the lower the value of the chromosome value, the better the variables in the corresponding chromosome are for forecasting the target item. In this case, forecasting module 105 may sort the population table in ascending order of chromosome value. On the other hand, if the forecasting process is attempting to maximize the goal function (and thus the chromosome value) to a predetermined threshold value, the higher the value of the chromosome value, the better the variables in the corresponding chromosome are for forecasting the target item. In this case, forecasting module 105 may sort the population table in descending order of chromosome value.

Once the population table is sorted, forecasting module 105 may select a certain number of chromosomes to eliminate from the population table (step 235). In one embodiment, forecasting module 105 selects a certain percentage (e.g., 10-33%) of chromosomes to be removed from the bottom of the population table. Accordingly, in the exemplary table 400 shown in FIG. 4, if 10% of the chromosomes are selected, the bottom sixty of the data values, or the rows themselves, may be removed from the table 400.

Forecasting module 105 may also perform a reproduction process that replenishes the chromosomes removed in step 235 with new chromosomes (step 237). In one embodiment, forecasting module 105 selects two chromosomes, or parents, from the population table at random using a scheme that favors the chromosomes with better chromosome values. The chromosomes for each of the two selected parents are then cut at a randomly chosen position, referred to as a crossover point. The slicing of the chromosomes results in two head and tail segments, which are swapped to produce two full-length chromosomes known as offspring. The two offspring chromosomes are then placed back into the population table, thus replacing the positions of two chromosomes previously removed from the table. The above described reproduction process may be repeated by forecasting module 105 until each removed chromosome is replaced with an offspring chromosome. Accordingly, when forecasting module 105 completes the reproduction process, the population array will be the same size as it was prior to step 235.

To further illustrate the reproduction process, consider the exemplary block diagrams shown in FIGS. 5A-5D. As shown in FIG. 5A, an exemplary population table 501 includes a portion 520 reflecting a set of chromosomes that are selected for removal and a portion 510 reflecting a set of chromosomes not selected for removal. In FIG. 5B, portion 520 is removed from the population table leaving portion 510. The memory locations associated with portion 520 may be physically available to forecasting module 105, but the data values for each cell in portion 520 may be deleted. In FIG. 5C, forecasting module 105 may randomly select two parent chromosomes 512 and 514 from portion 510. Also a crossover point 525 is selected. The crossover point 525 is used by forecasting module 105 to split each parent chromosome into a head portion 513, 517 and a tail portion 515, 519. The tails portions of each parent chromosome are then swapped to create two offspring chromosomes 530 and 540. Subsequently, as shown in FIG. 5D, the offspring chromosomes 530 and 540 are added to portion 510 to create a new population table 505. The process described in FIGS. 5C and 5D may be repeated until there are enough new offspring chromosomes to replace the number of chromosomes included in portion 520. Consequently, the number of chromosomes in population tables 505 and 501 will be the same.

Referring back to FIG. 2, forecasting module 105 may also perform a mutation process that includes changing the data values of a randomly selected number of cells in the population table (step 239). In one embodiment, forecasting module 105 may select a certain percentage of cells (e.g., 0.1% to 3.0%) in the population table to be mutated. For each selected cell, forecasting module 105 may randomly select a new data value for the cell based on the boundary values associated with the cell's corresponding variable. In other embodiments, forecasting module 105 may change the percentage of cells mutated in the population table based on the number of iterations that have been completed in genetic algorithm 230. As the number of iterations increases, the number of unique chromosomes may decrease. Thus, to avoid converging on a local optima (rather than the global best), the mutation rate may be increased over a range (e.g., 0.1% to 3.0%) during the convergence process.

Following step 230, forecasting module 105 may determine whether the best chromosome value in the population table is converging toward a target value (step 240). In one embodiment, forecasting module 105 may compare the best chromosome value with a previous best chromosome value. If the difference between the previous and current best chromosome values is within a predetermined threshold, the forecasting process has determined a convergence point (e.g., a data value equal to, or within a predetermined range of, the target value) (step 240, Yes). If, on the other hand, the difference between the best and previous chromosome values is not within the predetermined threshold, the data enhancement process (step 230) is repeated until the convergence point is obtained (step 240, No). Alternatively, the best chromosome value may be compared to a threshold value to determine whether a convergence point has been obtained.

When forecasting module 105 determines that the convergence point has been reached, (step 240, Yes) the data values for each cell in the chromosome corresponding to the best chromosome value are used to solve the forecast function including the one or more equations selected in step 220 (step 250). For example, referring to FIG. 4, if chromosome 410 is selected as the most fit chromosome based on its chromosome value (chromosome value column 420), the data values for $A_1$, $B_1$, $C_1$, and $F_1$ through $A_5$, $B_5$, $C_5$, and $F_5$ and $m_1$, $D_1$ through $m_5$, $D_5$ are used to solve the forecast function $F(t)=A_1 \sin(B_1 t+C_1)+F_1+A_2 \sin(B_2 t+C_2)+F_2+\ldots+A_5 \sin(B_5 t+C_5)+F_5+M_1 t+D_1+\ldots+m_5 t+D_5$, for a selected time t.

Accordingly, forecasting module 105 may forecast the value for F(t) at a future time "t" by using the data values from the best fit chromosome. That is, forecasting module 105 may use the forecast function F(t) to generate forecast data indicating, e.g., a forecast of future characteristics of a target item, such as future demand of a product.

Once the selected forecast function including one or more equations is solved using the variables from the most fit chromosome, forecasting module 105 may determine an error value and a confidence value that is associated with the forecast function determined in step 250 (step 260). Accordingly, forecasting module 105 may produce a forecasted characteristic for a target item that includes an error value and a confidence factor that reflects a level of confidence in the forecast data. In one embodiment, the error value is based on the average error $e_{avg}$ that is associated with the goal function (GF). To determine the confidence factor, forecasting module may perform a statistical process that performs an F-Test, or similar statistical process, on the calculated (forecasted) data values and the historical data values for the characteristics of the target item. The F-test produces a data value representing a probability of the calculated characteristic data values being true. The probability data value is then converted into a confidence factor representing a percentage of confidence in the forecasted characteristic data values determined in step 250. For example, forecasting module 105 may provide forecasted information for characteristics of a target item that includes a predicted data value with an error and a confidence factor.

The confidence factor may be used by forecasting module 105, or a user, to determine whether the forecast data should be implemented. For instance, suppose based on the historical characteristic data values shown in table 300, forecasting module 105 determines that in 36 months (e.g., t=36), the demand for a product manufactured by a business may be 36 units, plus or minus 3 units, with a confidence factor of 90%. Based on the high level of confidence in the forecasted number, a user, or an analysis process performed by forecasting module 105, may determine that 36-38 units should be manufactured to meet the predicted demand at the $36^{th}$ month interval. Alternatively, if the level of confidence is low (e.g., confidence factor of 60%), the user or forecasting module 105 may determine that additional units should be manufactured to ensure the business does not miss a sale due to insufficient inventory or produce fewer units to avoid excess inventory buildup.

In addition to incorporating business goals into the goal function of a genetic algorithm, in certain embodiments, forecasting module 105 may implement the genetic algorithm (or part of the genetic algorithm) as discussed with regard to FIG. 2 multiple times, each time for a different goal function corresponding to a particular business goal. That is, forecasting module 105 may determine a best fit chromosome for a goal function corresponding to each business goal and may generate forecast data based on the best fit chromosome for each goal function. Then, forecasting module 105 may implement the genetic algorithm a final time, using a goal function that takes into account the business goals that were used in the previous implementations of the genetic algorithm.

Figure 6:
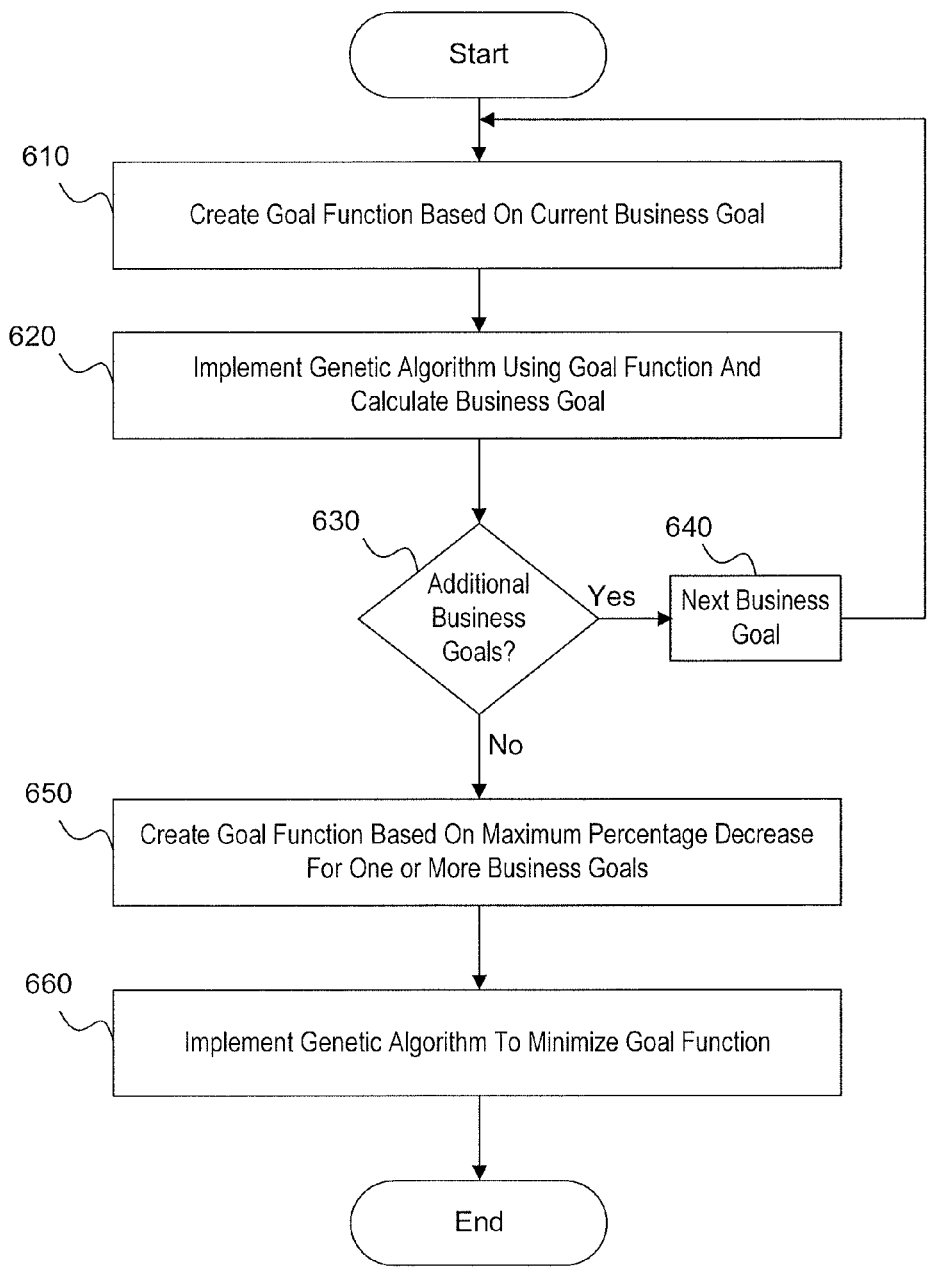
FIG. 6 is a flow chart illustrating an exemplary forecasting process that may take into account one or more business goals, consistent with disclosed embodiments.

For example, forecasting module 105 may implement a multipoint optimization technique as shown in FIG. 6. First, forecasting module 105 may implement the genetic algorithm process discussed with regard to FIG. 2 for each business goal. That is, forecasting module 105 may create a goal function based on a business goal, such as service level (step 610). For example, the goal function may simply be equal to the business goal or may be some function of the business goal, such as the square of the business goal, square root of the business goal, or any other function. Forecasting module 105 may then implement the genetic algorithm process discussed above with regard to FIG. 2 such that the goal function for that particular business goal is maximized, e.g., such that service level is maximized (step 620). At step 620, forecasting module 105 may also calculate the value of the particular business goal corresponding to the goal function. Thus, if the goal function is based on service level, then forecasting module 105 may calculate the service level value for the selected chromosome in that implementation of the genetic algorithm.

Forecasting module 105 may then determine whether there are any additional business goals (step 630). For example, as discussed above, a user may instruct forecasting module 105 to include one or more business goals in the forecasting strategy. If additional business goals have been included (step 630, Yes), then forecasting module 105 may proceed to the next business goal (step 640), generate a goal function for that business goal (step 610), and implement the genetic algorithm process discussed with regard to FIG. 2 using the goal function (step 620). This way, forecasting module 105 may implement the genetic algorithm using a goal function that corresponds to one of the business goals for each implementation. For example, if service level, RONA, profit, and inventory turns are defined as four business goals, forecasting module 105 may implement the genetic algorithm four times, a first time with a goal function that includes a measurement of service level, a second time with a goal function that includes a measurement of RONA, a third time with a goal function that includes a measurement of profit, and a fourth time with a goal function that include a measurement of inventory turns.

After forecasting module 105 has implemented the genetic algorithm for each of the business goals and determined that there are no additional business goals (step 630, No), forecasting module 105 may create an additional goal function that is based on a maximum percentage decrease for one or more of the business goals (step 650). For example, the additional goal function may include a measurement of a maximum percentage decrease from among each business goal value calculated in step 620 and the corresponding business goal value calculated based on one or more chromosomes generated in step 650.

For example, if service level (SL), profit (P), RONA, and inventory turns (IT) are included as business values, then the goal function (GF) calculated for a given i-th chromosome may be represented as:

$$GF = MAX((SL_m - SL_i)/SL_i, (P_m - P_i)/P_i, (RONA_m - RONA_i)/RONA_i, (IT_m - IT_i)/IT_i)$$

where MAX(a, b, c, d) is equal to the value of one of a, b, c, or d that has the maximum value among the group. $SL_m$, $P_m$, $RONA_m$, and $IT_m$ each represent the value of the business goal calculated in the implementation of the genetic algorithm in step 620 when that particular business value was used in the goal function. For example, $SL_m$ represents the service level calculated by the genetic algorithm in the implementation of the genetic algorithm in step 620 when service level is included in the goal function, $P_m$ represents the profit calculated by the genetic algorithm in the implementation of the genetic algorithm in step 620 when profit is included in the goal function, etc. $SL_i$, $P_i$, $RONA_i$, and $IT_i$ each represent the value of a particular business goal for the i-th chromosome generated by the genetic algorithm implemented in step 660.

After forecasting module 105 creates the goal function in step 650, forecasting module 105 may implement the genetic algorithm to minimize the goal function created in step 650 (step 660). For example, forecasting module 105 may implement the genetic algorithm process discussed with regard to FIG. 2 to generate a chromosome that minimizes the goal function created in step 650 (step 660). Thus, if the equation above is used, forecasting module 105 may implement the genetic algorithm to select a chromosome that minimizes a maximum percentage difference between the solution optimized for each business goal and a general solution that is not business-goal specific.

Those skilled in the art will understand that other goal functions may be created in step 650. For example, the goal function (GF) may be a weighted sum of the percentage differences for each business goal, such that:

$$GF = a(SL_m - SL_i)/SL_i + b(P_m - P_i)/P_i + c(RONA_m - RONA_i)/RONA_i + d(IT_m - IT_i)/IT_i)$$

where a, b, c, and d represent different weights assigned to each of the respective business goals. Weights a, b, c, and d may be customizable by a user. In one embodiment, a, b, c, and d may be configurable to be any value between 0 and 1 such that $a+b+c+d=1$. Of course, other equations may be used to implement the goal function in step 650 such as functions including averages, weighted averages, products, or any other mathematical calculation involving one or more business goals.

In certain embodiments, forecasting module 105 may implement the genetic algorithm using one or more process constraints. The process constraints may include limits or ranges on the forecast data being output by the genetic algorithm. In the example where the forecast data represent orders, sales, production, shipping, etc., of a product, the process constraints may include one or more of, e.g., a maximum or minimum: inventory level, volume of units/time period, velocity at which a number of units can be produced, shipped, etc., (e.g., the derivative with respect to time of the volume of units/time period), and acceleration at which a number of units can be produced, shipped, etc., (e.g., the second derivative with respect to time of the volume of units/time period). As discussed above, this information may be stored in database 140, for example.

Figure 7:
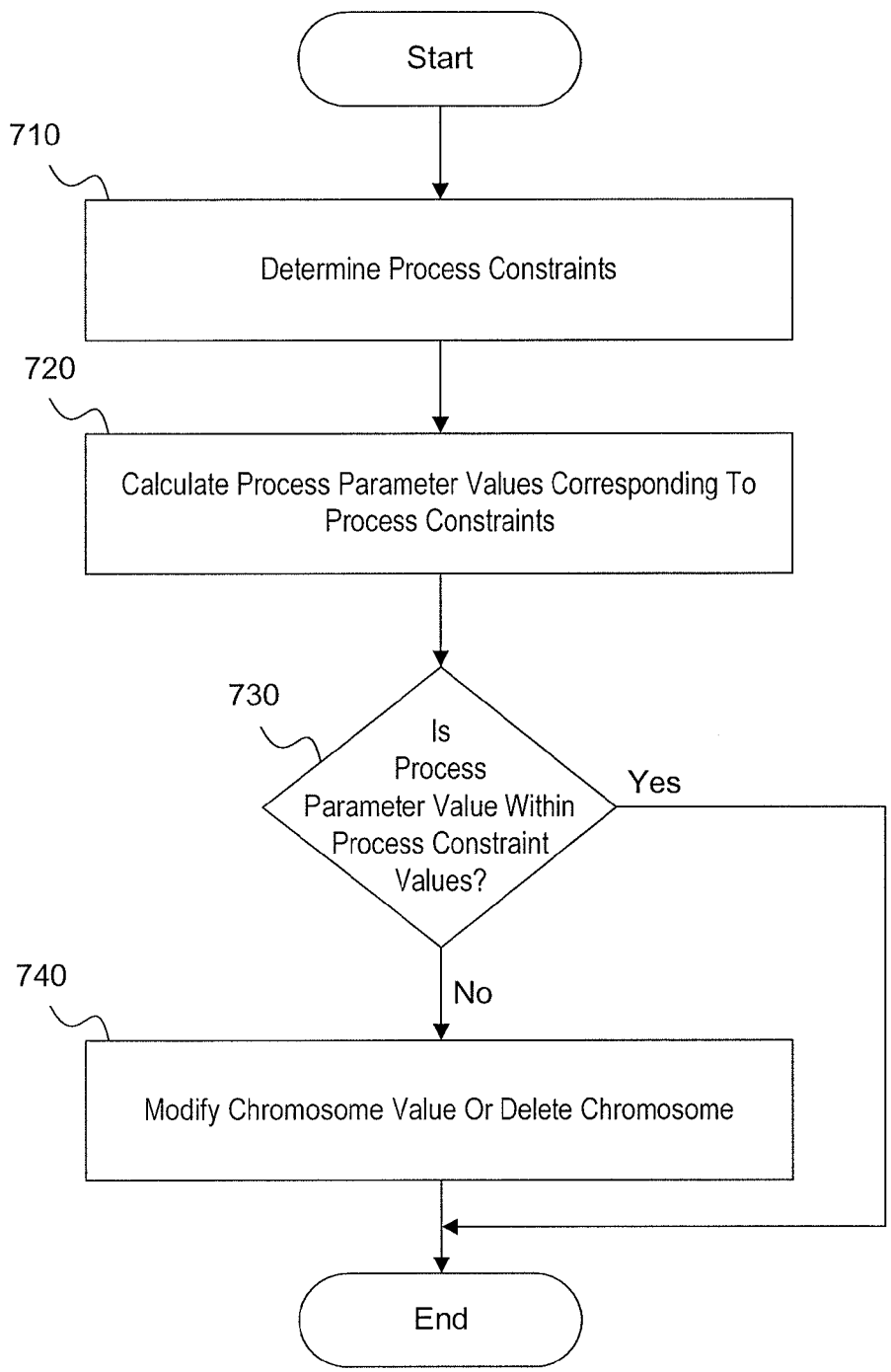
FIG. 7 is a flow chart illustrating an exemplary process for incorporating process constraints into a forecasting process, consistent with disclosed embodiments.

According to exemplary embodiments, forecasting module 105 may implement a genetic algorithm using one or more of the process constraints in accordance with the process shown in FIG. 7. For example, forecasting module 105 may determine which process constraints to use and may determine values for the process constraints (step 710). Forecasting module 105 may determine these values based on user input, historical data, contractual obligations, or other information. For example, a user may enter the process constraint values for one or more process constraints, such as a maximum inventory level at a manufacturing facility. Likewise, forecasting module 105 may determine process constraint values for one or more process constraints by analyzing historical data. In one embodiment, forecasting module 105 may determine that a maximum and a minimum inventory, volume of units/time period, and/or the velocity and/or acceleration thereof each corresponds to a historical maximum and minimum in the historical data, e.g., stored in database 140 or elsewhere. Forecasting module 105 may also determine process constraint values based on existing contractual obligations. For example, if a company is contractually obligated to provide "x" units to its customers during each time period, then the minimum volume of product units/time period may be set based on "x."

Forecasting module 105 may calculate process parameter values corresponding to the process constraints determined in step 710 for one or more chromosomes generated by the genetic algorithm, e.g., in step 231 (step 720). For example, if a process constraint corresponding to the maximum and minimum volume of units/time period is used, then forecasting module 105 may calculate the volume of units/time period for one or more chromosomes for one or more time intervals in the time period corresponding to the historical data and/or in the time period corresponding to the forecast data. For example, as discussed above, each chromosome may include variables for a forecasting function such as: $F(t) = A_1 \sin(B_1 t + F_1 + A_2 \sin(B_2 t + C_2) + F_2 + \ldots + A_5 \sin(B_5 t + C_5) + F_5 + M_1 t + D_1 + \ldots + m_5 t + D_5$. Thus, forecasting module 105 may solve the forecast function F(t) for the one or more chromosomes at one or more time intervals in the past and/or in the future, e.g., to calculate the volume of units/time period at each time interval.

Likewise, if other process constraints are used, forecasting module 105 may calculate corresponding process parameter values for one or more of the chromosomes in the same manner. For example, if a process constraint corresponding to the velocity of product units/time period (e.g., product units/time period$^2$) is used, forecasting module 105 may calculate the derivative of the forecasting function F(t) with respect to time. Then, forecasting module 105 may solve the derivative of the forecasting function for each of the one or more chromosomes at one or more time intervals. Alternatively, forecasting module 105 may perform a discrete time derivative calculation using the values calculated by solving the forecast function F(t) for the one or more chromosomes at each time interval. In another example, forecasting module 105 may calculate the current inventory position for a chromosome for each interval. Forecasting module 105 may calculate the current inventory position using the methods discussed above with regard to FIG. 3. These values may then be compared to a process constraint value related to maximum or minimum inventory levels at any point in time.

Forecasting module 105 may compare the determined process parameter values for one or more chromosomes to the process constraint values (step 730). That is, forecasting module 105 may determine whether the process parameter values determined for a chromosome in step 720 are within the process constraint values determined in step 710. In the example above, where forecasting module 105 calculates the volume of units/time period for the equation for F(t), forecasting module 105 may compare the maximum and minimum volume of units/time period generated by the forecast function F(t) to the process constraints representing the maximum and minimum volume of units/time period.

If one or more process parameter values are not within the process constraint values (step 730, No), forecasting module 105 may modify the chromosome value of the chromosome (step 740). For example, if forecasting module 105 determines that a process parameter value is outside of the process constraint values, forecasting module 105 may modify the chromosome value of the corresponding chromosome to move it away from the convergence criteria of the goal function in the genetic algorithm. In other words, if the genetic algorithm is attempting to maximize the chromosome value (e.g., based on the goal function), then forecasting module 105 may reduce the chromosome value of the chromosome that has a process parameter value outside of the process constraint values. On the other hand, if the genetic algorithm is attempting to minimize the chromosome value, then forecasting module 105 may increase the chromosome value of the chromosome that has a process parameter value outside of the process constraint values.

In one embodiment, forecasting module 105 may modify (e.g., reduce or increase) the chromosome value of the corresponding chromosome by a predetermined percentage, such as 50%, when one or more process parameter values are outside of the process constraint value. In other embodiments, forecasting module 105 may modify the chromosome value by an amount or percentage proportional to an amount or percentage by which the process parameter values are above or below the process constraint values. For example, if a process parameter value for a chromosome, such as current inventory level, is 10% higher than the maximum inventory level used as the process constraint value, then forecasting module 105 may reduce (or increase) the chromosome value of that particular chromosome by 10%.

Moreover, if multiple process constraints are used, forecasting module 105 may modify the chromosome value for each process parameter value that is outside of the process constraint values. For example, if inventory level and a volume of units/time period are both used as process constraints, forecasting module 105 may determine that the inventory level parameter value exceeds the inventory parameter constraint by 10% and the volume of units/time period parameter value is less than the volume of units/time period parameter constraint by 20% for a particular chromosome. Thus, forecasting module 105 may modify the chromosome value of that chromosome by 30% of its calculated value.

In yet another embodiment, forecasting module 105 may modify the chromosome value of a corresponding chromosome to be equal to a modified number (e.g., zero or a minimum number if the genetic algorithm is attempting to maximize the chromosome value or a maximum number if the genetic algorithm is attempting to minimize the chromosome value), or otherwise remove or eliminate the chromosome from the population table used to generate subsequent chromosomes whenever a process parameter is outside of a particular process constraint. For example, if forecasting module 105 uses population table 400 shown in FIG. 4 (or a similar table) to store and sort chromosomes, forecasting module 105 may completely remove the chromosome from population table 400.

On the other hand, if forecasting module 105 determines that the process parameter values are within the process constraint values (step 730, Yes), forecasting module 105 may not modify the chromosome value of the corresponding chromosome, and may allow the corresponding chromosome to be used in the genetic algorithm as discussed above, without modifying the chromosome value.

Figure 8:
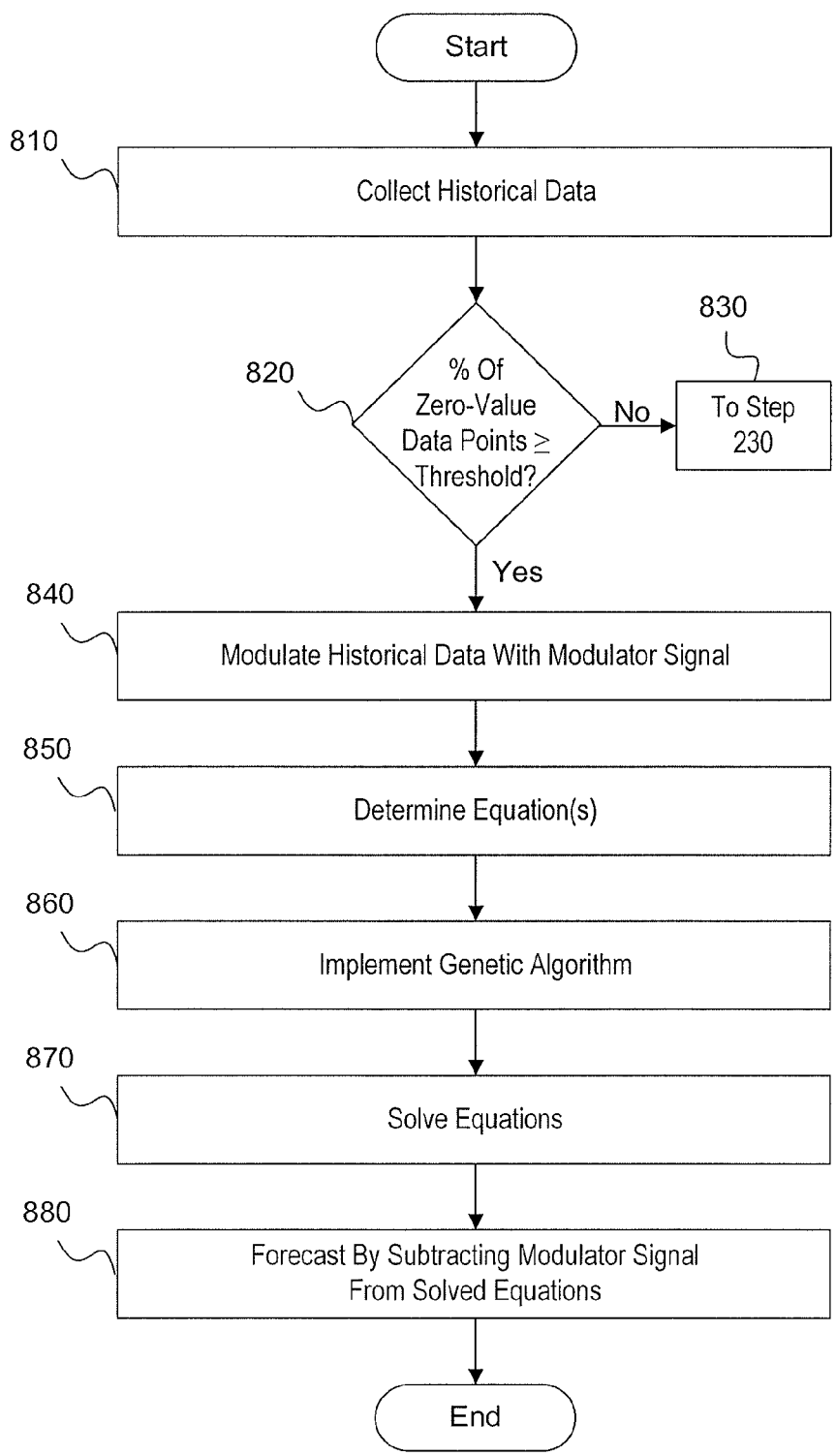
FIG. 8 is a flow chart illustrating an exemplary forecasting process that may modulate historical data, consistent with disclosed embodiments.

In certain embodiments, forecasting module 105 may modulate the historical data used by the genetic algorithm. In one embodiment, forecasting module 105 may analyze the historical data and modulate the historical data when a percentage or predetermined number of zero-value or near-zero-value data points are included in the historical data. For example, forecasting module 105 may modulate the historical data according to the process shown in FIG. 8.

Forecasting module 105 may collect historical data similar to step 210 discussed above (step 810). For example, the historical data may include historical order, sale, manufacture, and/or shipping information for a particular product, group of products, service part, etc. The historical data may be arranged chronologically and may be grouped according to historical time periods. For example, the historical data may represent a number of units of a product (or service part) ordered, sold, manufactured, and/or shipped per time interval, e.g., per day, week, month, year, etc.

Forecasting module 105 may determine a number of time intervals in the historical data that have zero value or near-zero value data points. For example, forecasting module 105 may determine a number of time intervals where the number of products ordered, sold, manufactured, and/or shipped is equal to zero or a number near zero. Forecasting module 105 may then compare a number of zero value data points (or near-zero value data points) to a threshold value (step 820). The threshold value may be represented as a percentage value of the total number of zero value data points (or near-zero value data points) compared to the total number of data points in the historical data. In one embodiment, the threshold value may be 10%, although other values, e.g., 5%, 15%, 20% or 50% may also be used.

If forecasting module 105 determines that the number of zero value data points is less than the threshold value (step 820, No), forecasting module 105 may implement the genetic algorithm without modulating the historical data (step 830). For example, forecasting module 105 may implement the genetic algorithm as shown in FIG. 2, and/or in accordance with one or more of the embodiments discussed herein. In one embodiment, forecasting module 105 may implement the genetic algorithm using the business-goal-based goal function discussed above with regard to FIG. 6, for example.

If forecasting module 105 determines that the number of zero value data points is greater than or equal to the threshold value (step 820, Yes), forecasting module 105 may modulate the historical data with a modulator signal (step 840). For example, forecasting module 105 may add a time series of the historical data to a sinusoidal waveform modulator signal.

In certain embodiments, the modulator signal may be a low-frequency modulator signal represented as $A \sin(Bt+C)+F$. Forecasting module 105 may determine the values of $A$ and $F$ such that the value of the low-frequency modulator signal is always greater than or equal to zero. In other embodiments, forecasting module 105 may determine the values of $A$ and $F$ such that the value of the low-frequency modulator signal is always greater than or equal to a predetermined value. Moreover, forecasting module 105 may determine the values of $A$ and $F$ such that the resulting modulated historical data, which is being modulated by the low-frequency modulator signal is always greater than or equal to zero or some predetermined value.

Forecasting module 105 may also determine the value of $B$, the frequency of the low-frequency modulator signal. In one embodiment, forecasting module 105 may determine the value of $B$ such that the oscillation period of the low-frequency modulator signal is less than or equal to one-third the length of time T over which the historical data is measured. For example, if the length of time over which the historical data is measured equals 36 months, then forecasting module 105 may calculate $B$ such that the period of the low-frequency modulator signal is 12 months or less, e.g., such that $B$ is greater than or equal to $\pi/6$. In another embodiment, forecasting module 105 may determine the value of $B$ based on the length of time over which the future data is being forecasted. For example, forecasting module 105 may determine the value of B such that the oscillation period of the low-frequency modulator signal is less than or equal to one-third the length of time over which the future data is being forecasted. While one-third is used as an example, other values may also be used.

Forecasting module 105 may then determine an intermediary function including the equation (s) to be used in the genetic algorithm (step 850). These equations may be determined similar to the process discussed above with regard to step 220, or may be determined according to any other embodiment described herein. For example, in one embodiment, the equations may be determined to be one or more sinusoidal functions and one or more linear functions as discussed above. However, as discussed, other functions may be used.

Forecasting module 105 may implement the genetic algorithm (step 860), e.g., by generating populations of chromosomes, calculating chromosome values, generating and sorting population tables, selecting chromosomes for reproduction and/or mutation, and analyzing chromosome values to determine whether the genetic algorithm has converged, similar to the process described above with regard to steps 230-240 in FIG. 2. However, in step 860 forecasting module 105 may use the modulated historical data when determining the chromosome values to analyze the one or more chromosomes.

After the genetic algorithm converges, forecasting module 105 may solve the equations selected in step 850 using the data values for each cell in the chromosome corresponding to the best chromosome value (step 870).

After solving the equations, forecasting module 105 may generate a forecast function by subtracting the modulator signal from the intermediary function including the solved equations (step 880). Thus, if an intermediary function including the solved sinusoidal and linear equations is represented as:

$$F(t)=A_1 \sin(B_1 t+C_1)+F_1+A_2 \sin(B_2 t+C_2)+F_2+\ldots A_5 \sin(B_5 t+C_5)+F_5+m_1 t+D_1 \ldots m_5 t+D_5$$

for a selected time t then the forecast function generated by forecasting module 105 may be represented as:

$$F(t)_{new}=A_1 \sin(B_1 t+C_1)+F_1+A_2 \sin(B_2 t+C_2)+F_2+\ldots +A_5 \sin(B_5 t+C_5)+F_5+m_1 t+D_1+\ldots +m_5 t+D_5-(Q \sin(Rt+S)+U).$$

As discussed above, forecasting module 105 may determine a forecasting function including mathematical equations that represent a target item forecast (e.g., a demand, manufacture, shipping, etc., of products, replacement parts, service parts, etc.) based on the historical data. For example, as discussed, forecasting module 105 may use a sum of one or more continuous functions, such as sinusoidal and/or linear functions to represent a forecast function. In certain embodiments, forecasting module 105 may generate an attenuated forecast function that includes one or more signal attenuating functions. The signal attenuating functions may act as signal interruption or attenuation stencils that attenuate (i.e., reduce the value) or interrupt (i.e., reduce the value to zero or fully attenuate) the signal value generated by the sum of the one or more sinusoidal, linear, or other mathematical functions (e.g., the signal produced by the equation for the forecast function F(t), discussed above).

In certain embodiments, each signal attenuating function used by forecasting module 105 may attenuate the forecast function (e.g., the signal generated by the sum of the one or more sinusoidal and/or linear functions) at periodic intervals to generate an attenuated forecast function. Moreover, the amount by which each attenuating function attenuates the forecast function may be adjustable. Further, a point in time at which the attenuating functions alter the forecast function, the frequency at which they alter it, and the amount by which they attenuate it (or whether they interrupt it completely) may be determined based on the genetic algorithm, as discussed in greater detail below.

In one embodiment, forecasting module 105 may determine the attenuated forecast function representing, e.g., a manufacture of products to be:

$$F_a(t) = \sum_1^i [A_i \sin(B_i(t+C_i)) + F_i] + \sum_1^j [m_j t + D_j] - \sum_1^k [G_k \mathrm{sgn}(\sin(\psi_k(t+\gamma_k))+L_k)]|F(t) \geq 0$$

where the first two summations of equations represent the original forecast function, e.g., as discussed above. For example, the first two summations of equations represent a general format for the equation for F(t), discussed above, except that in the equation for F(t), i=5 and j=5. The final summation of equations, $G_k \mathrm{sgn}(\sin(\psi_k(t_k+\gamma_k))+L_k)$, represents an attenuating function that partially attenuates (i.e., subtracts from) or interrupts (i.e., fully attenuates or subtracts to zero) the value of the signal produced by the original forecast function. For example, by changing the values of the variables $G_k$ using the genetic algorithm, forecasting module 105 may either attenuate or interrupt (i.e., fully attenuate) the continuous signals of the original forecast function.

In the equations above, sgn(f(x)) represents a modified sign or signum function. Thus, when f(x) is negative or equals 0, sgn(f(x)) equals 0, and when f(x) is positive, sgn(f(x)) equals 1. Thus, each attenuating function $G_k \mathrm{sgn}(\sin(\psi_k(t_k+\gamma_k))+L_k)$ is either equal to 0 or a value $G_k$ at any given time, based on the value of $\sin(\psi_k(t_k+\gamma_k))+L_k$. That is, if $\sin(\psi_k(t_k+\gamma_k))+L_k$ is negative or equal to 0, then the attenuating function equals 0, but if $\sin(\psi_k(t_k+\gamma_k))+L_k$ is positive, then the attenuating function equals $G_k$. When the attenuating function equals $G_k$, the attenuating function attenuates the forecast function represented by the first two summations of equations by an amount $G_k$. Thus, by selecting a value for $G_k$, forecasting module 105 may determine whether to attenuate or completely interrupt (i.e., fully attenuate) the signal of the forecast function during a particular time (i.e., when $\sin(\psi_k(t_k+\gamma_k))+L_k$ is positive). As discussed, forecasting module 105 may determine the value of $G_k$ using a genetic algorithm.

Figure 9:
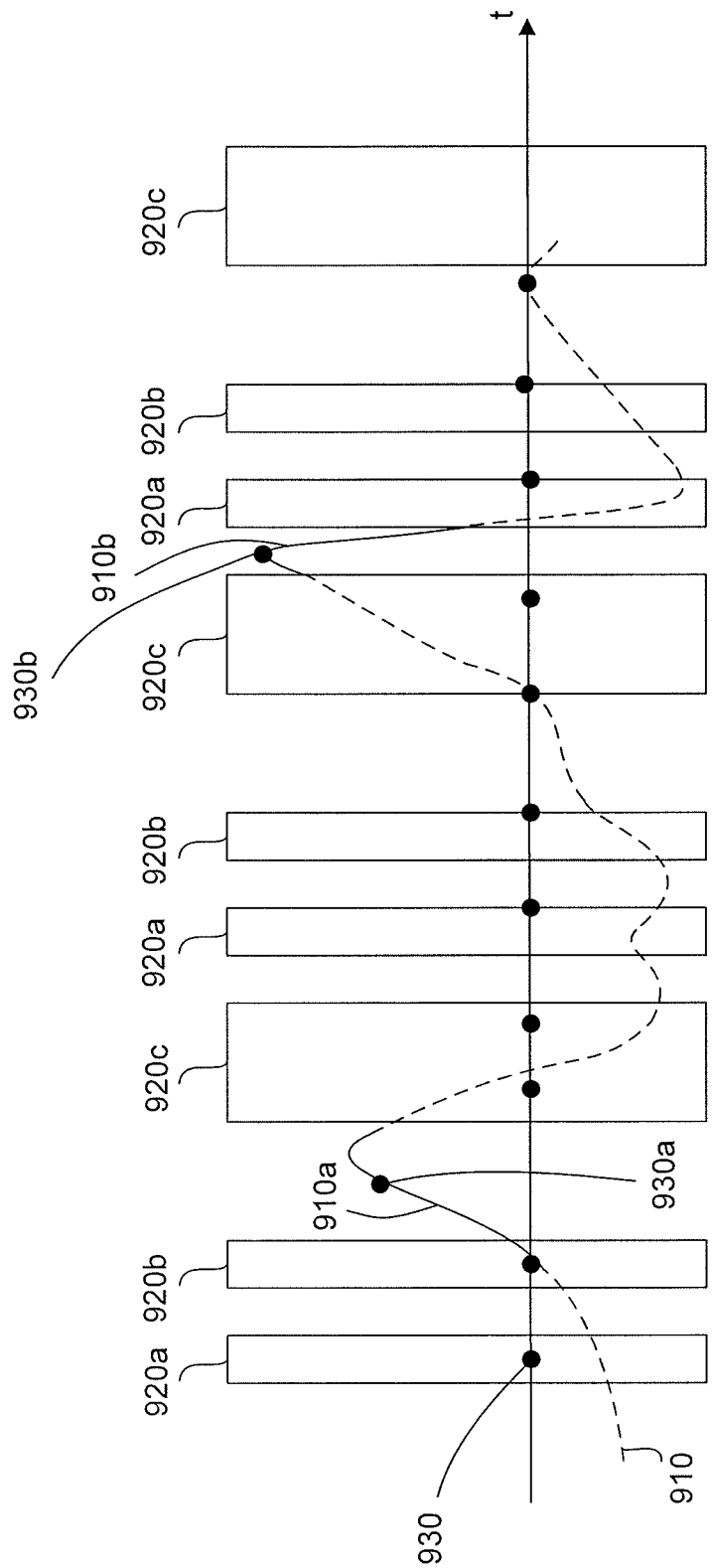
FIG. 9 is an illustration of an exemplary target item forecast function that may include one or more attenuating functions, consistent with disclosed embodiments.

FIG. 9 shows a graph that illustrates how forecasting module 105 may incorporate the continuous equations from the original forecast function with the attenuating functions. For example, FIG. 9 illustrates a curve 910 that may represent a forecast for a target item, such as a forecast for a manufacture of products along a timeline. Curve 910 may be represented, e.g., by the original forecast function that includes a combination of continuous functions, such as the summation of sinusoidal and linear functions described in the first two summations of equations in the function $F_a(t)$ shown above.

FIG. 9 shows curve 910 having solid portions 910a and 910b, with the remaining portions of curve 910 being shown as dotted lines. The dotted line portions are the portions of the continuous functions, represented by F(t) shown above, that are being attenuated. In particular, the dotted line portions include all of the portions of curve 910 that are either less than 0, or that are overlapped by one of attenuation patterns 920a, 920b, and 920c. Attenuation patterns 920a, 920b, and 920c may be representations of the final summation of $G_k\text{sgn}(\sin(\psi_k(t_k+\gamma_k))+L_k)$ equations in $F_a(t)$. For example, as shown in FIG. 9, attenuation patterns 920a-c repeat in a predetermined sequence. Thus, attenuation pattern 920a may represent the equation $G_k\text{sgn}(\sin(\psi_k(t_k+\gamma_k))+L_k)$ for k=1, attenuation pattern 920b may represent the equation $G_k\text{sgn}(\sin(\psi_k(t_k+\gamma_k))+L_k)$ for k=2, etc.

When the summation of $G_k\text{sgn}(\sin(\psi_k(t_k+\gamma_k))+L_k)$ equations is incorporated into the $F_a(t)$ function as described above, the summation of $G_k\text{sgn}(\sin(\psi_k(t_k+\gamma_k))+L_k)$ equations attenuate or completely interrupt the continuous equations in areas where the attenuation patterns exist. Thus, the function $F_a(t)$ may be represented graphically as the two solid portions 910a and 910b that are both positive and are not covered by an attenuation pattern.

In the example shown in FIG. 9, the values of $G_k$ for the different k values are each large enough such that the attenuation patterns completely interrupt the continuous signals (i.e. fully attenuate the signal such that the signal equals zero). However, in other embodiments, the values of $G_k$ may be smaller, such that the patterns may not fully attenuate the continuous signals in areas where they overlap. For example, if a point on the continuous signal representing the original forecast demand function F(t) is equal to a number such as 50, and $G_1$ is equal to 15, then the pattern for k=1 may only suppress the continuous equations by a value of 15 in areas where they overlap. Thus, if the pattern for k=1 overlaps the continuous signal where F(t)=50, then the resultant value for $F_a(t)$ may be 35, if no other patterns overlap at that point.

While exemplary attenuating functions discussed above may be represented as $G_k\text{sgn}(\sin(\psi_k(t_k+\gamma_k))+L_k)$, those skilled in the art will appreciate that other attenuating functions may be used. For example, disclosed embodiments may used one or more infinite impulse response (IIR) and/or finite impulse response (FIR) filters as attenuating functions.

When determining the forecasted order, sale, and/or manufacture of products, forecasting module 105 may plot points 930 at each of their respective time periods, e.g., at each time interval in the forecast data time period. For example, points 930 may be plotted at each month and may be representative of the number of products manufactured in that month. As can be seen from FIG. 9, points 930a and 930b have non-zero values while the remaining points 930 have values of zero because the continuous functions have either been fully attenuated by the attenuation patterns of the attenuating functions or because the value of the continuous signal representing the original forecast demand function F(t) is less than zero at that point.

Figure 10:
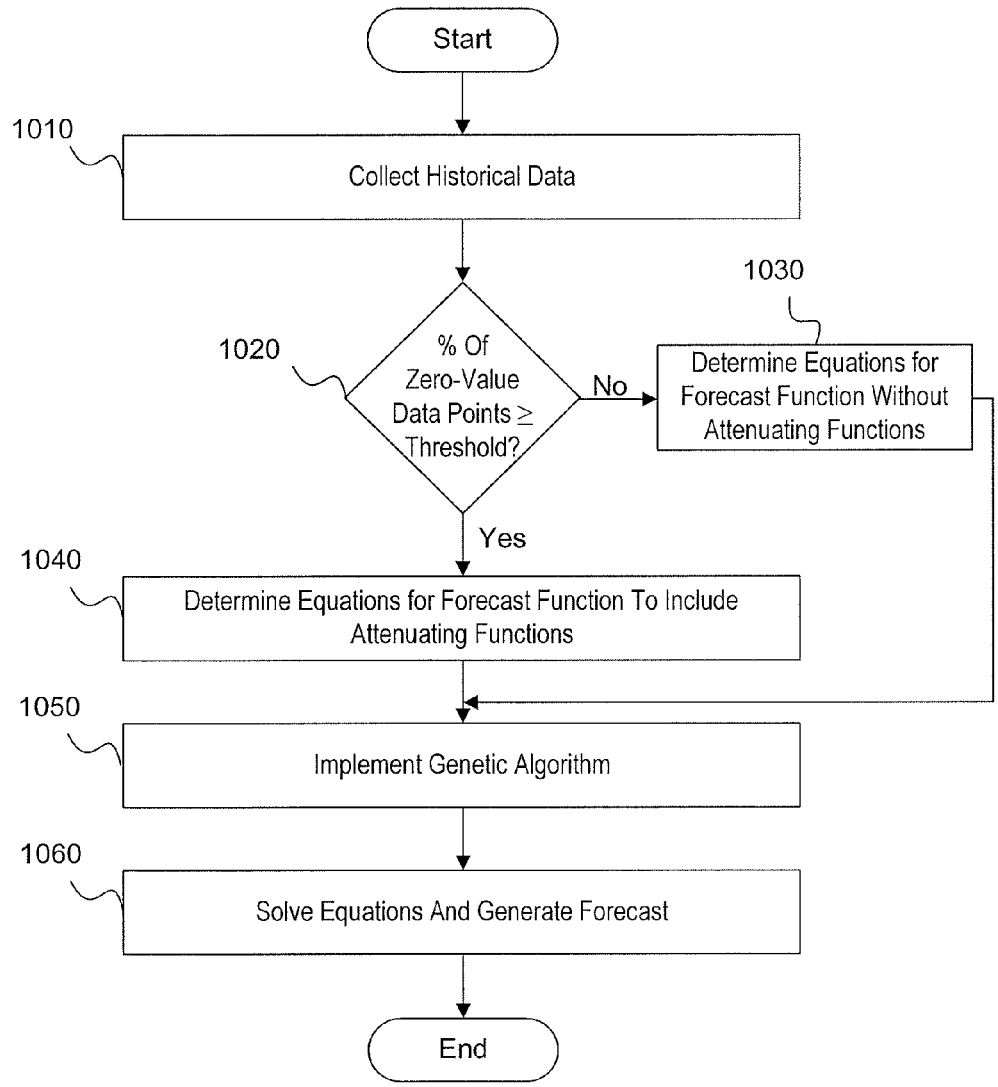
FIG. 10 is a flow chart illustrating an exemplary forecasting process that may incorporate one or more attenuating functions, consistent with disclosed embodiments.

FIG. 10 shows a flowchart of an exemplary process that may be performed by forecasting module 105 to generate forecast characteristics by using interruption patterns. For example, forecasting module 105 may collect historical data similar to the processes discussed above (step 1010). Forecasting module 105 optionally may analyze the historical data to determine if a number or percentage of the historical data points that are zero or near-zero exceed a threshold value (step 1020). For example, forecasting module 105 may determine if the historical data points have 10% or more zero-value data points. While 10% is used in this embodiment, other values, e.g., 5%, 15%, 20%, 50%, etc., may be used. Moreover, in certain embodiments, forecasting module 105 may not analyze the historical data for a number of zero value or near-zero value data points and may instead proceed directly to step 1040.

Returning to FIG. 10, if, at step 1020, forecasting module 105 determines that the number or percentage of zero value data points is less than a threshold value (step 1020, No) then forecasting module 105 may determine that the equations to be used for the forecast function in the genetic algorithm do not include any attenuating functions (step 1030). For example, forecasting module 105 may determine that the equations to be used in the genetic algorithm include the sinusoidal and linear functions of F(t), but not the attenuating functions.

If forecasting module 105 determines that the number or percentage of zero-value data points is greater than or equal to the threshold value (step 1020, Yes), then forecasting module 105 may determine that the equations to be used for the genetic algorithm include one or more attenuating functions (step 1040). For example, forecasting module 105 may determine that the equations to be used for the genetic algorithm include the functions of $F_a(t)$ discussed above with regard to FIG. 9.

Forecasting module 105 may then implement the genetic algorithm using the equations selected in either step 1030 or step 1040. If the equations were chosen in step 1030, the genetic algorithm may proceed as discussed in the other embodiments above. If the equations were chosen in step 1040 (e.g., if the equations include one or more attenuating functions), then forecasting module 105 may implement the genetic algorithm to also determine values of the variables in the attenuating functions. For example, the genetic algorithm chromosomes may also include data values for variables $G_k$, $\psi_k$, $t_k$, $\gamma_k$, and $L_k$ for each value of k, as well as data values for each of the variables of the sinusoidal and linear functions for each value of i and j, respectively. These additional data values may be added, e.g., to table 400 as shown in FIG. 4, when implementing the genetic algorithm. Thus, forecasting module 105 may choose different values for each of the variables $G_k$, $\psi_k$, $t_k$, $\gamma_k$, and $L_k$ for each value of k when generating different chromosomes, and may implement the one or more of the processes discussed above (e.g., implement a genetic algorithm) to optimize the chromosome values according to some goal function. Then forecasting module 105 may select a chromosome with the best chromosome value to be used to generate the forecast data.

Forecasting module 105 may solve the equations determined in steps 1030 or 1040 based on the chromosome selected by the genetic algorithm in step 1050 and generate a forecast for the target item (step 1060). For example, forecasting module 105 may solve the equation by inputting the variables for the sinusoidal, linear, and attenuating functions corresponding to the selected chromosome into the forecast function. Forecasting module 105 may then determine forecast values for each time interval in the forecast data time period by determining a value of the forecast function at a point in time during the particular time interval, as shown by points 930 in FIG. 9.

In certain embodiments, forecasting module 105 may implement the forecasting processes (e.g., implement the genetic algorithm) on a regular basis, such as at the beginning, middle, or end of each time interval over the course of time. However, in other embodiments, forecasting module 105 may selectively implement the forecasting processes (e.g., may selectively generate new forecast data for a target item using the genetic algorithm) by analyzing a portion of the historical data to determine whether the forecast should be updated.

Forecasting module 105 may determine whether to generate a new forecast based on analyzing historical data within an observation window. The observation window may include a subset of the historical data. For example, the observation window may include a subset of historical data that is closest to the current time period. However, the observation window may also include any subset of the historical data, or may include all of the historical data.

Figure 11:
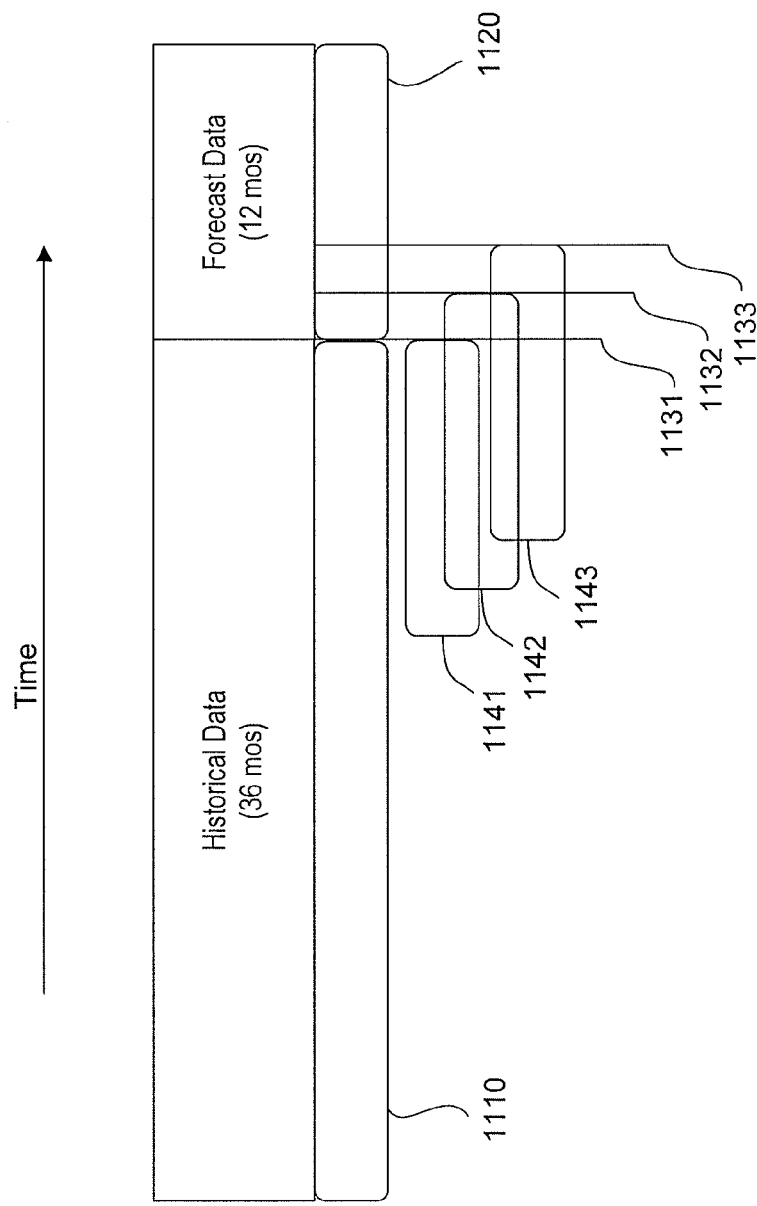
FIG. 11 is a block diagram illustrating an exemplary relationship among observation windows and historical data, consistent with disclosed embodiments.

FIG. 11 illustrates a block diagram showing an exemplary relationship among observation windows 1141-1143 and historical data 1110. For example, as shown in FIG. 11, at a time period 1131, forecasting module 105 may include historical data 1110 collected up to the point in time of time period 1131. At or before time period 1131, forecasting module 105 may have generated forecast data 1120, e.g., using one or more of the processes disclosed herein. For example, forecasting module 105 may have generated forecast data 1120 by generating a forecast function, implementing a genetic algorithm to determine a chromosome with values for each of the variables in forecast function, and then calculating the forecast data by integrating the values for the chromosome with the forecast function and determining values of the forecast function at time intervals within the forecast data time period.

As shown in FIG. 11, observation window 1141 may include a subset of historical data 1110. In certain embodiments, forecasting module 105 may determine the length of observation window 1141 based on the values of historical data 1110. For example, the length of observation window 1141 may be equal to the longest section of consecutive zero data value points in historical data 1110 plus some constant value, such as 1, or any other constant. In another embodiment, the length of observation window 1141 may be equal to twice the longest section of consecutive zero-data value points in historical data 1110. Observation windows of other lengths may also be used, e.g., observation window 1141 may be determined to be one half the length of the entire historical data 1110, or any other fractional amount consistent with disclosed embodiments.

At time period 1131, forecasting module 105 may evaluate one or more business goals based on the data in observation window 1141 to determine whether or not a new forecast should be generated. For example, forecasting module 105 may calculate the profit, RONA, inventory turns, service level, or other business goal values for one or more time intervals in observation window 1141 using the historical data from observation window 1141 and one or more of the equations discussed above for calculating these business goals. Forecasting module 105 may then evaluate the calculated business goals to determine whether forecast data 1120 should be updated. In certain embodiments, forecasting module 105 may incorporate one or more control guidelines to determine whether forecast data 1120 should be updated. Moreover, forecasting module 105 may apply different guidelines to different business goals.

For example, for one or more business goals, such as service level, forecasting module 105 may determine that forecast data 1120 should be updated when the value of the business goal in the subsequent observation window is less than the value of the business goal in the previous window (e.g., service level has fallen over time, profit has decreased over time, etc.). For example, as shown in FIG. 11, forecasting module 105, at time period 1132, may determine whether the service level calculated based on the data in observation window 1142 is less than the service level calculated based on the data in observation window 1141. If forecasting module 105 determines that the service level has decreased, forecasting module 105 may determine that forecast data 1120 should be updated, and may then implement the forecasting processes discussed above (e.g., implement the genetic algorithm) to generate a new forecast.

Forecasting module 105 may also determine that the forecast data should be updated when a value of a business goal is outside of a determined threshold or band. For example, forecasting module 105 may determine that forecast data should be updated any time the value of the service level has fallen below 95% or below 100%. Likewise, forecasting module 105 may determine that the forecast data should be updated any time the profit, RONA, or inventory turns is outside of a range between $x_1$ and $x_2$.

Forecasting module 105 may also determine whether a forecast should be updated by applying one or more statistical control processes to statistically analyze one or more business goals and determine whether business goals are trending out of control. If forecasting module 105 determines that the business goals are trending out of control, forecasting module 105 may recalculate the forecast data. In certain embodiments, forecasting module 105 may implement one or more Nelson rules or Western Electric rules to determine whether the business goals are trending out of control, and may recalculate the forecast data in response to the determination.

For example, forecasting module 105 may determine that the business goals are trending out of control if a value of a business goal calculated based on the historical data at one time period is more than a predetermined number of standard deviations away from the mean of the business goal values calculated based on the historical data in the observation window. The predetermined number of standard deviations may be determined based on the intermittency of the historical data. For example, the number of standard deviations away from the mean that a value must be to indicate that the business goals are out of control may increase with the increased intermittency of the data. In other words, if the historical data in the observation window contains a larger number of zero value data points, then a particular business goal value may be required to deviate by a greater amount in order to indicate that the business goals are out of control.

Likewise, forecasting module 105 may also determine that the business goals are trending out of control if more than a predetermined number or percentage of business goal values calculated for consecutive time periods is greater than or less than the mean of the business goal values calculated for all the time periods in the observation window. Forecasting module 105 may similarly determine that the business goals are trending out of control if a predetermined number of business goal values calculated for consecutive time intervals are continually increasing or decreasing over time. In these embodiments, the predetermined numbers of consecutive business goal values greater or less than the mean, and/or business goal values that are continually increasing or decreasing may also be determined by forecasting module 105 based on the intermittency of the historical data.

Forecasting module 105 may also use other rules, such as determining whether a predetermined number of consecutive business goal values exhibit oscillation (e.g., alternate in direction, such as increase, decrease, increase, decrease, etc.), whether at least two out of three consecutive business goal values are more than a predetermined number of standard deviations away from the mean of the business goal values for the observation window in the same direction, whether at least four out of five consecutive business goal values are more than a predetermined number of standard deviations away from the mean of the business goal values for the observation window in the same direction, whether a predetermined number of consecutive business goal values exist that are all within a predetermined standard deviation of the mean of the business goal values in the observation window, or whether a predetermined number of consecutive business goal values exist without any of the predetermined number being within a predetermined number of standard deviations from the mean of the business goal values in the observation window, with the business goal values being on both sides of the mean. In these embodiments as well, the predetermined numbers discussed above may be determined by forecasting module 105 based on the intermittency of the historical data.

If, at time period 1131, forecasting module 105 determines that new forecast data should be generated, forecasting module 105 will do so, e.g., using the genetic algorithm processes discussed above, and will replace forecast data 1120 with newly generated forecast data. However, if forecasting module 105 determines that the business goals are in control or otherwise determines that new forecast data does not need to be generated, then forecast data 1120 will continue to be the current forecast data at time period 1132. At time period 1132, forecasting module 105 again determines whether the forecast data should be updated, e.g., using one or more of the guidelines discussed above. The process repeats itself such that if forecasting module 105 determines that the forecast data still does not need to be updated, then forecast data 1120 remains the forecast data at time 1133. This way, forecasting module 105 may optionally update the forecast data when updating is required based on the business goals, saving computing resources and reducing a number of production schedule changes for suppliers.

Moreover, when forecasting module 105 generates forecast data 1120, it may also assign a time-to-live value to forecast data 1120. For example, as shown in FIG. 11, forecast data 1120 may include forecast information for the next twelve months at time period 1131. However, if forecasting module 105 does not update forecast data 1120 with new forecast data, then by time period 1133, only ten months of forecast data may exist. Similarly, if forecasting module 105 were to determine, for eleven consecutive months, that forecast data 1120 does not need to be updated, then only one month of forecast data would exist. Thus, forecasting module 105 may also determine whether to update forecast data 1120 based on the amount of forecast data remaining, which may be expressed as the time-to-live value assigned to forecast data 1120.

For example, forecasting module 105 may assign a time-to-live value to a newly generated set of forecast data based on the length of the forecast data. In one embodiment, the time-to-live value may be set to be 50% of the length of time of the forecast value. Thus, if forecast data 1120 includes twelve months of forecast data, then forecasting module 105 may determine that forecast data 1120 should be updated after six months, even if, during the previous five months, forecasting module 105 determined that forecast data 1120 did not require updating, e.g., using one or more of the approaches discussed above. Fifty percent is an exemplary percentage, and other percentages may be used for the time-to-live. Moreover, the time-to-live value may be determined independently of the length of time of the forecast data. For example, the time-to-live value may be predetermined to be three months, or any other length of time.

Figure 12:
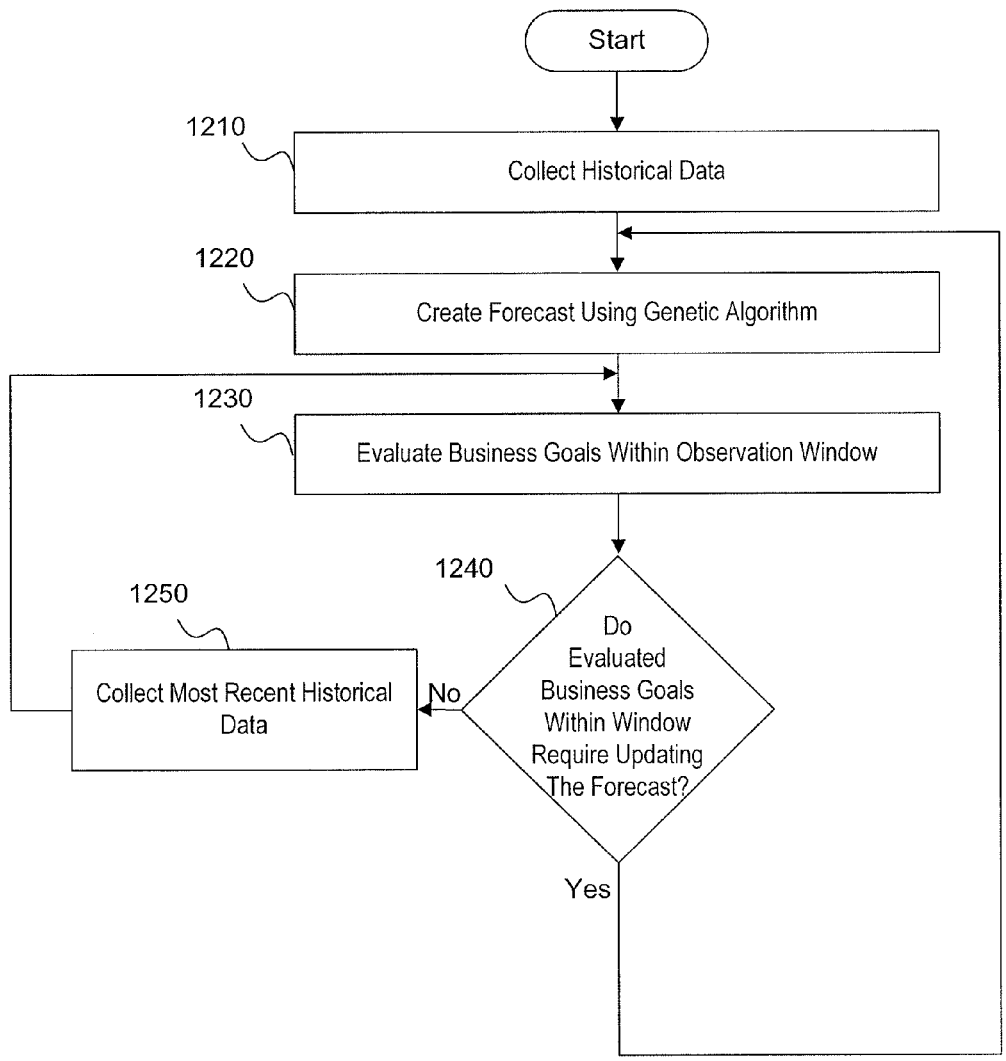
FIG. 12 is a flow chart illustrating an exemplary process for updating target item forecast data, consistent with disclosed embodiments.

FIG. 12 illustrates a process by which forecasting module 105 may selectively update forecast data for a target item by implementing a genetic algorithm. For example, forecasting module 105 may collect historical data similar to that discussed above with regard to previous embodiments (step 1210).

Forecasting module 105 may then create a forecast using, e.g., a genetic algorithm, in accordance with one or more of the embodiments discussed above (step 1220).

Forecasting module 105 may then evaluate one or more business goals within an observation window that may be a subset of the historical data (step 1230). For example, as discussed above, forecasting module 105 may calculate values for one or more business goals such as profit, RONA, inventory turns, service level, or any other business goal, at one or more time periods in the observation window.

Forecasting module 105 may compare the calculated business goal values to one or more guidelines or process control rules to determine whether the forecast data should be updated (step 1240). Moreover, at step 1240, forecasting module 105 may also determine whether the forecast data should be updated based on a time-to-live value associated with the current forecast data.

If forecasting module 105 determines that the forecast data does not need to be updated, i.e. that the business goals are in control, meet the guidelines being implemented, and/or the forecast data has not exceeded its time to live, then forecasting module 105 may not update the forecast data (step 1240, No). Instead, forecasting module 105 may wait until a subsequent time interval (e.g., a week, month, quarter, year, etc.), collect the most recent historical data (step 1250), and reevaluate the business goals within a subsequent observation window at the subsequent time interval (step 1230). For example, if the time period increments are one month, then forecasting module 105 may wait one month, collect the new historical data generated during that month, reevaluate the business goals for the new observation window that has moved forward by one month, and again determine whether the forecast data should be updated.

If forecasting module 105 determines that the forecast data does need to be updated, i.e. that the business goals are out of control, do not meet the guidelines being implemented, and/or the forecast data has exceeded its time to live, as discussed above (step 1240, Yes), then forecasting module 105 may create a new forecast, e.g., using the genetic algorithm with the historical data (step 1220).

INDUSTRIAL APPLICABILITY

Methods, systems, and articles of manufacture consistent with features related to the disclosed embodiments allow a system to forecast values for a target item based on historical data associated with the target item. These methods and systems may be applied to any particular tangible and/or non-physical target item. In one embodiment, a target item may represent a product that is manufactured, delivered, and/or maintained by a business entity, such as a manufacturer. Non-limiting examples of a product may include a vehicle, parts of a vehicle, commercial and/or residential appliances, tools, food service products, and any type of product that may be designed, developed, created, generated, manufactured, delivered, and/or stored as inventory.

Methods and systems consistent with certain embodiments implement a genetic algorithm to generate a forecast function that may be used to produce forecast data for a product. Moreover, methods and systems consistent with certain embodiments implement the genetic algorithm at certain times, upon determining that forecast data should be updated. For example, disclosed embodiments may selectively recalculate forecast data based on an analysis of the historical data contained within an observation window. This way, the forecast data may be updated selectively, resulting in accurate forecasts as well as reliable schedules for suppliers.

Moreover, while several embodiments have been described herein, those skilled in the art will appreciate that one or more disclosed embodiments may be combined with one or more other disclosed embodiments. For example, embodiments that selectively recalculate forecast data based on an analysis of the historical data contained within an observation window may be combined with embodiments discussed above that generate a goal function incorporating one or more business goals. Likewise, embodiments that selectively recalculate forecast data based on an analysis of the historical data contained within an observation window may be combined with embodiments discussed above that use one or more process constraints to modify a chromosome value of one or more chromosomes generated by the genetic algorithm having process parameter values outside of the process constraint values. Moreover, embodiments that selectively recalculate forecast data based on an analysis of the historical data contained within an observation window may be combined with embodiments discussed above that modulate historical data with a low-frequency modulator signal and generate a forecast function that subtracts the low frequency modulator signal from the function generated by the genetic algorithm. Further, embodiments that selectively recalculate forecast data based on an analysis of the historical data contained within an observation window may also be combined with embodiments discussed above that generate an attenuated forecast function including one or more attenuating functions. Still further, any combination of the embodiments discussed above may be combined in any manner.

Disclosed embodiments may be implemented in various environments. Such environments and related applications may be specially constructed for performing the various processes and operations consistent with disclosed embodiments. The processes disclosed herein are not inherently related to any particular system, and may be implemented by a suitable combination of electrical-based components.

It will be apparent to those skilled in the art that various modifications and variations can be made to the disclosed forecasting system. Other embodiments will be apparent to those skilled in the art from consideration of the specification and practice of the disclosed forecasting system. It is intended that the specification and examples be considered as exemplary only, with a true scope being indicated by the following claims and their equivalents.

What is claimed is:

1. A computer-implemented method for forecasting characteristics of a target item comprising:
    generating, by one or more processors, forecast data for a target item based on historical data related to the target item, the forecast data representing a forecast for characteristics of the target item;
    analyzing, by the one or more processors, a subset of the historical data within an observation window to determine whether the forecast data should be updated with new forecast data;
    generating, by the one or more processors, the new forecast data for the target item responsive to a determination that the forecast data should be updated with the new forecast data;
    determining a longest number of consecutive time intervals in the historical data that have zero value data points; and
    configuring a length of the observation window to be at least one time interval longer than the longest number of consecutive time intervals in the historical data having zero value data points.

2. The computer-implemented method of claim 1, wherein the length of the observation window is twice the longest number of consecutive time intervals in the historical data having zero value data points.

3. The computer-implemented method of claim 1, further including:
    determining whether one or more calculated business goal values calculated based on one or more time intervals in the observation window are trending out of control by applying one or more Nelson rules or one or more Western Electric rules;
    determining that the new forecast data should be generated responsive to determining that the calculated business goal values are trending out of control;
    configuring, based on a number of zero data values in the historical data, one or more parameters of the Nelson rules or Western Electric rules being applied.

4. The computer-implemented method of claim 1, further including:
    assigning a time-to-live value to the forecast data; and
    determining that the new forecast data should be generated when the forecast data is older than the time-to-live value.

5. A characteristic forecasting system comprising:
    a processor; and
    a memory module configured to store instructions, that, when executed, enable the processor to:
        generate forecast data for a target item based on historical data related to the target item, the forecast data representing a forecast for characteristics of the target item;
        analyze a subset of the historical data within an observation window to determine whether the forecast data should be updated with new forecast data; and
        generate the new forecast data for the target item responsive to a determination that the forecast data should be updated with the new forecast data;
        determine a longest number of consecutive time intervals in the historical data that have zero value data points; and
        configure a length of the observation window to be at least one time interval longer than the longest number of consecutive time intervals in the historical data having zero value data points.

6. The system of claim 5, wherein the length of the observation window is twice the longest number of consecutive time intervals in the historical data having zero value data points.

7. A characteristic forecasting system comprising:
    a processor; and
    a memory module configured to store instructions, that, when executed, enable the processor to:
        generate forecast data for a target item based on historical data related to the target item, the forecast data representing a forecast for characteristics of the target item;
        analyze a subset of the historical data within an observation window to determine whether the forecast data should be updated with new forecast data;
        generate the new forecast data for the target item responsive to a determination that the forecast data should be updated with the new forecast data;
        determine whether one or more calculated business goal values calculated based on one or more time intervals in the observation window are trending out of control; and
        determine that the new forecast data should be generated responsive to determining that the calculated business goal values are trending out of control;
        determine whether the one or more calculated business goal values are trending out of control by applying one or more Nelson rules or one or more Western Electric rules; and configure, based on a number of zero data values in the historical data, one or more parameters of the Nelson rules or Western Electric rules being applied.

8. A characteristic forecasting system comprising:

a processor; and a memory module configured to store instructions, that, when executed, enable the processor to:

generate forecast data for a target item based on historical data related to the target item, the forecast data representing a forecast for characteristics of the target item;

analyze a subset of the historical data within an observation window to determine whether the forecast data should be updated with new forecast data; and generate the new forecast data for the target item responsive to a determination that the forecast data should be updated with the new forecast data;

assign a time-to-live value to the forecast data; and determine that the new forecast data should be generated when the forecast data is older than the time-to-live value.

* * * * *

UNITED STATES PATENT AND TRADEMARK OFFICE
CERTIFICATE OF CORRECTION

PATENT NO. : 8,676,630 B2  
APPLICATION NO. : 13/367721  
DATED : March 18, 2014  
INVENTOR(S) : Grichnik et al.

Page 1 of 1

It is certified that error appears in the above-identified patent and that said Letters Patent is hereby corrected as shown below:

In the Specification

Column 7, lines 22-23, delete "$F(1)=A_1 \sin(B_1+C_1)+F_1+A_2 \sin(B_2+C_2)+F_2+\ldots A_5 \sin(B_5+C_5)+F_5+m_1+D_1+\ldots+M_5+D_5$" and insert -- $F(1)=A_1 \sin(B_1+C_1)+F_1+A_2 \sin(B_2+C_2)+F_2+\ldots A_5 \sin(B_5+C_5)+F_5+m_1+D_1+\ldots+m_5+D_5$ --.

Column 7, lines 26-27, delete "$F(2)=A_1 \sin(B_1(2)+C_1)+F_1+A_2 \sin(B_2(2)+C_2)+F_2+\ldots A_5 \sin(B_5(2)+C_5)+F_5+m_1(2)+D_1+\ldots m_5(2)+D_5$" and insert -- $F(2)=A_1 \sin(B_1(2)+C_1)+F_1+A_2 \sin(B_2(2)+C_2)+F_2+\ldots A_5 \sin(B_5(2)+C_5)+F_5+m_1(2)+D_1+\ldots m_5(2)+D_5$ --.

Column 7, lines 45-46, delete "$F(6)=\sin(B_1(6)+C_1)+F_1+A_2 \sin(B_2(6)+C_2)+F_2+\ldots A_5 \sin(B_5(6)+C_5)+F_5+m_1(6)+D_1+\ldots m_5(6)+D_5$" and insert -- $F(6)=A_1 \sin(B_1(6)+C_1)+F_1+A_2 \sin(B_2(6)+C_2)+F_2+\ldots A_5 \sin(B_5(6)+C_5)+F_5+m_1(6)+D_1+\ldots m_5(6)+D_5$ --.

Column 13, lines 13-15, delete "$F(t)=A_1 \sin(B_1t+C_1)+F_1+A_2 \sin(B_2t+C_2)+F_2+\ldots+A_5 \sin(B_5t+C_5)+F_5+M_1t+D_1+\ldots+m_5t+D_5,$" and insert -- $F(t)=A_1 \sin(B_1t+C_1)+F_1+A_2 \sin(B_2t+C_2)+F_2+\ldots+A_5 \sin(B_5t+C_5)+F_5+m_1t+D_1+\ldots+m_5t+D_5,$ --.

Column 16, lines 23-26, delete "$F(t)=A_1 \sin(B_1t++F_1+A_2 \sin(B_2t+C_2)+F_2+\ldots+A_5 \sin(B_5t+C_5)+F_5+M_1t+D_1+\ldots+m_5t+D_5.$" and insert -- $F(t)=A_1 \sin(B_1t+C_1)+F_1+A_2 \sin(B_2t+C_2)+F_2+\ldots+A_5 \sin(B_5t+C_5)+F_5+m_1t+D_1+\ldots+m_5t+D_5.$ --.

Signed and Sealed this  
Fifteenth Day of September, 2015

Michelle K. Lee  
*Director of the United States Patent and Trademark Office*